(12) United States Patent
Okazaki et al.

(10) Patent No.: US 7,978,920 B2
(45) Date of Patent: Jul. 12, 2011

(54) METHOD AND SYSTEM FOR PROCESSING AN IMAGE, METHOD AND APPARATUS FOR DECODING, METHOD AND APPARATUS FOR ENCODING, AND PROGRAM WITH FADE PERIOD DETECTOR

(75) Inventors: Toru Okazaki, Chiba (JP); Junichi Tanaka, Kanagawa (JP); Kazushi Sato, Kanagawa (JP); Yoichi Yagasaki, Tokyo (JP)

(73) Assignee: Sony Corporation, Tokyo (JP)

( * ) Notice: Subject to any disclaimer, the term of this patent is extended or adjusted under 35 U.S.C. 154(b) by 1039 days.

(21) Appl. No.: 11/764,590

(22) Filed: Jun. 18, 2007

(65) Prior Publication Data
US 2008/0089404 A1    Apr. 17, 2008

(30) Foreign Application Priority Data
Jun. 21, 2006   (JP) ................. P2006-171635

(51) Int. Cl.
*G06K 9/46* (2006.01)
(52) U.S. Cl. .......... 382/233; 375/240; 708/203
(58) Field of Classification Search .......... 382/232, 382/233; 375/240; 708/203
See application file for complete search history.

(56) References Cited

U.S. PATENT DOCUMENTS

| | | | | |
|---|---|---|---|---|
| 5,500,689 | A * | 3/1996 | Lam | 348/699 |
| 5,654,759 | A * | 8/1997 | Augenbraun et al. | 375/240.03 |
| 6,959,042 | B1 * | 10/2005 | Liu et al. | 375/240.02 |
| 2002/0136295 | A1 * | 9/2002 | Sato | 375/240.03 |
| 2002/0157112 | A1 * | 10/2002 | Kuhn | 725/113 |
| 2003/0215014 | A1 * | 11/2003 | Koto et al. | 375/240.16 |
| 2006/0133486 | A1 | 6/2006 | Boyce | |

FOREIGN PATENT DOCUMENTS

| | | |
|---|---|---|
| JP | 2001-245304 | 9/2001 |
| JP | 2002-010270 | 1/2002 |
| JP | 2003-174653 | 6/2003 |
| JP | 2004-007379 | 1/2004 |
| JP | 2006-501760 | 1/2006 |
| JP | 2006-086861 | 3/2006 |

OTHER PUBLICATIONS

Office Action dated Oct. 12, 2010 from the Japanese Patent Office in Japanese Patent Application No. 2006-171635, 3 pages.

* cited by examiner

*Primary Examiner* — Vikkram Bali
*Assistant Examiner* — Eueng-Nan Yeh
(74) *Attorney, Agent, or Firm* — Finnegan, Henderson, Farabow, Garrett & Dunner, L.L.P.

(57) ABSTRACT

An image processing system includes a decoder configured to decode an encoded image and an encoder configured to encode the image decoded by the decoder. The decoder includes a decoder adapted to decode the encoded image, and a detector adapted to detect, on the basis of the image, a fade period included in the image and supply a fade information signal indicating a detection result to the encoder. The encoder includes an acquisition unit adapted to acquire the fade information signal, and a changing unit adapted to change a process performed in the encoding of the image in accordance with the fade information signal.

29 Claims, 19 Drawing Sheets

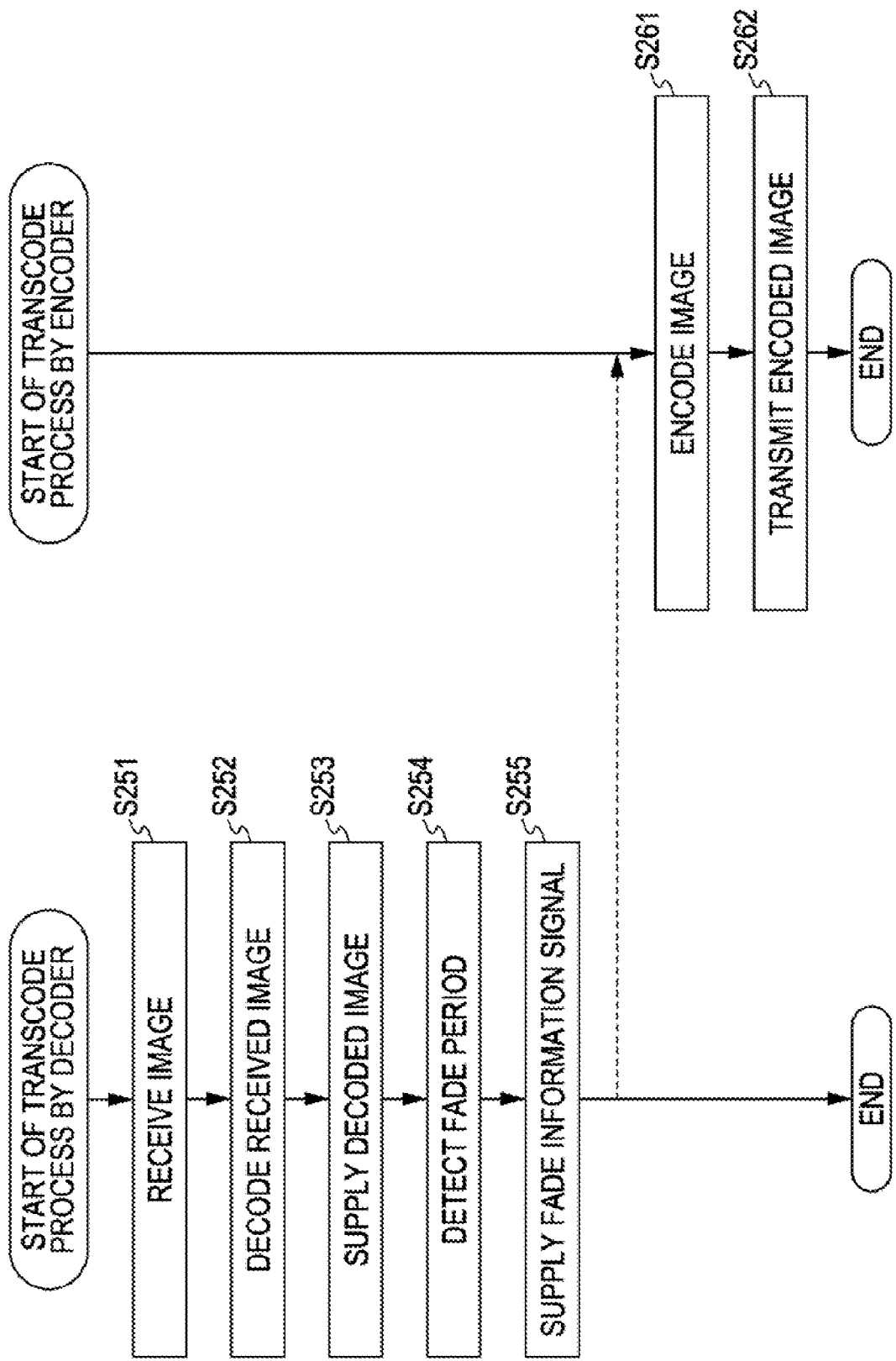

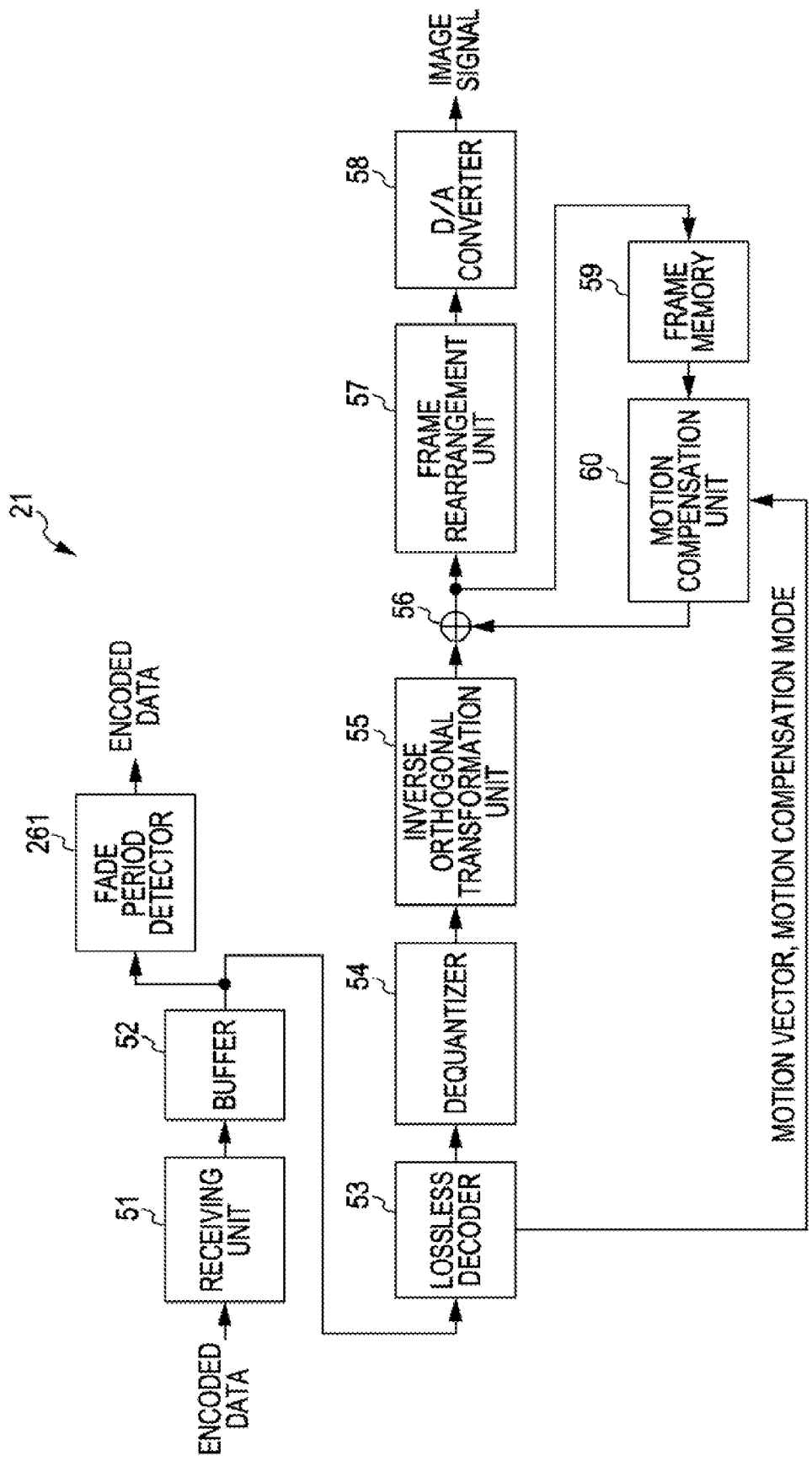

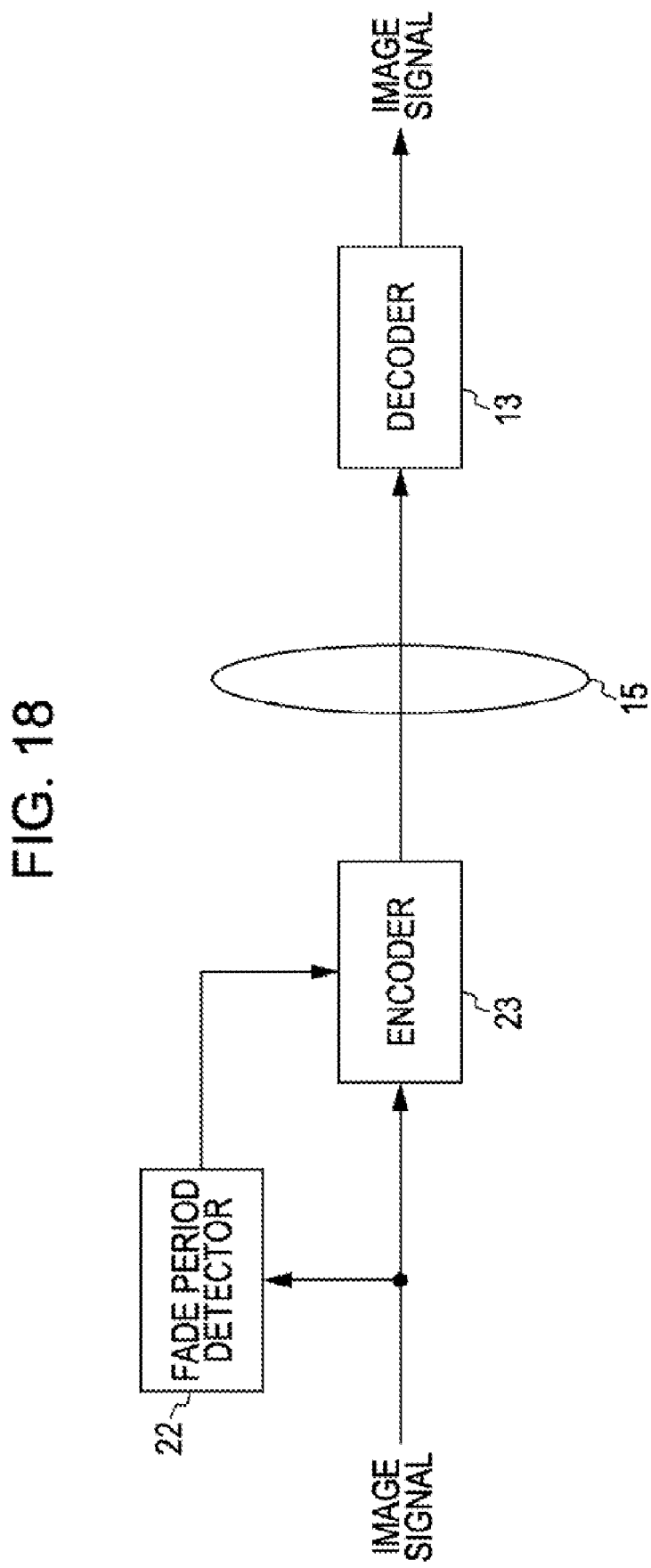

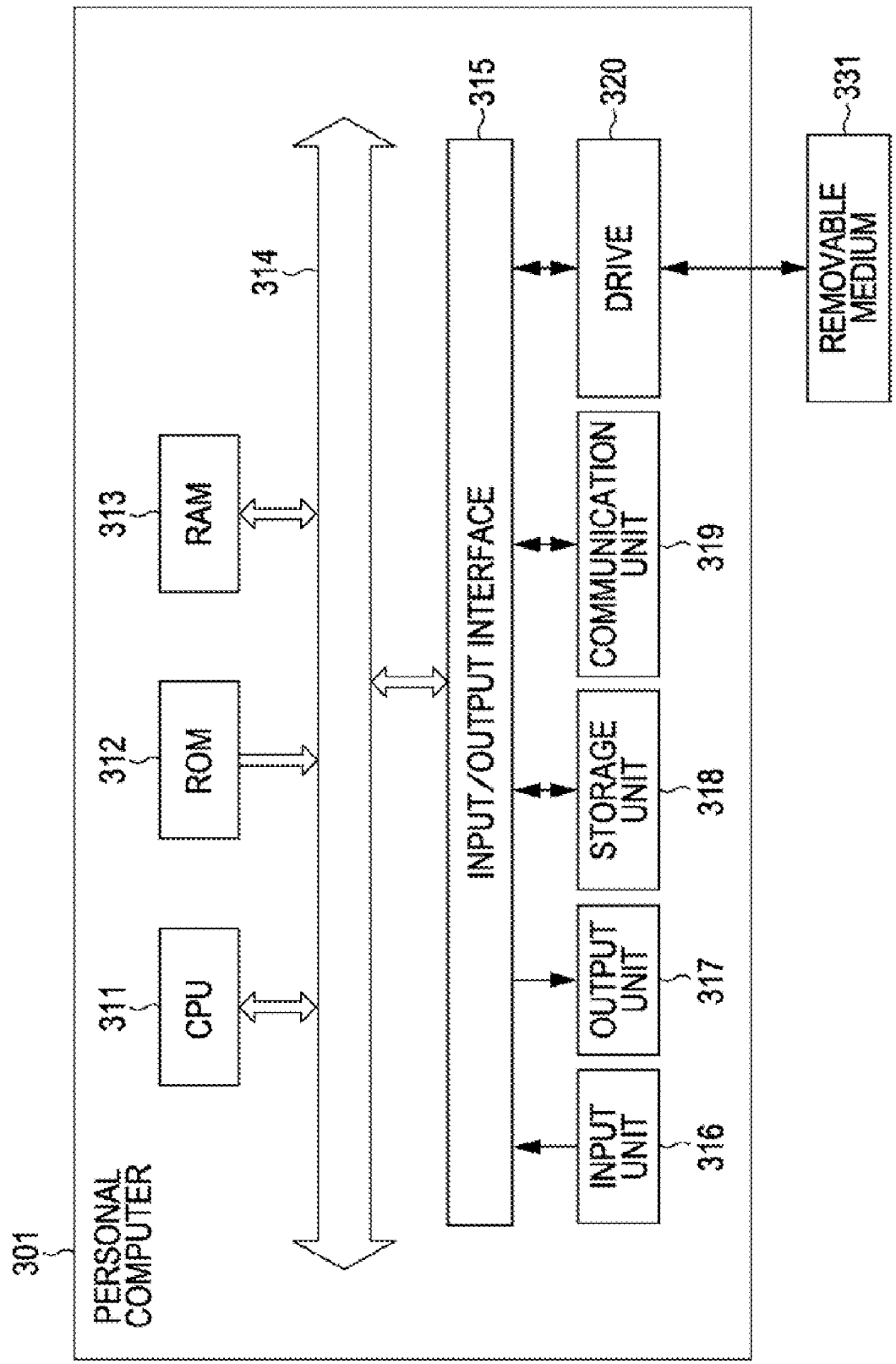

METHOD AND SYSTEM FOR PROCESSING AN IMAGE, METHOD AND APPARATUS FOR DECODING, METHOD AND APPARATUS FOR ENCODING, AND PROGRAM WITH FADE PERIOD DETECTOR

CROSS REFERENCES TO RELATED APPLICATIONS

The present invention contains subject matter related to Japanese Patent Application JP 2006-171635 filed in the Japanese Patent Office on Jun. 21, 2006, the entire contents of which are incorporated herein by reference.

BACKGROUND OF THE INVENTION

1. Field of the Invention

The present invention relates to a method and system for processing an image, a method and apparatus for decoding, a method and apparatus for encoding, and a program. More specifically, the present invention relates to a method and system for processing an image, a method and apparatus for decoding, a method and apparatus for encoding, and a program, which allow it to achieve high image quality.

2. Description of the Related Art

To transmit information from broadcast stations and to receive the information, a technique/apparatus according to the MPEG (Moving Picture Experts Group) standard is widely used. In the MPEG method, to achieve high efficiency in transmission and storage of information, moving image data is treated in the form of digital data and compressed using redundancy of the moving image by performing an orthogonal transformation such as a discrete cosine transform and moving compensation on the moving image.

For example, the MPEG-2 (ISO (International Organization for Standardization)/IEC (International Electrotechnical Commission) 13818-2) standard has been established as a standard for an encoding method for general-purpose moving images. The MPEG-2 supports both interlaced scanning images and progressive scanning images, and also supports both normal-definition images and high-definition images. The MPEG-2 standard is used in a wide variety of applications including professional applications and consumer applications.

In the MPEG-2 standard, a high compression ratio and high image quality can be achieved by assigning a bit rate (amount of code) of 4 to 8 Mbps to an interlaced scanning image having a normal resolution with 720×480 pixels. For an interlaced scanning image having a high resolution with 1920×1088 pixels, a high compression ratio and high image quality can be achieved by assigning a bit rate of 18 to 22 Mbps. In some encoders adapted to encode a moving image by the MPEG-2 method, a selection as to whether to use field prediction or frame prediction is made depending on luminance and color difference signals of the moving image (see, for example, Japanese Unexamined Patent Application Publication No. 2003-174653).

The MPEG-2 standard has been originally designed for high-quality images for use in broadcasting or the like, and the MPEG-2 standard does not support encoding at lower bit rates than the bit rates supported by the MPEG-1 standard, that is, the MPEG-2 standard does not support high-efficiency encoding. Portable terminal devices have come into wide use. As a result, there is an increasing need for a high-efficiency encoding method. To meet the above requirement, the MPEG-4 standard has been proposed. The proposed method of encoding images according to the MPEG-4 standard was officially approved in December of 1993 as international standard ISO/IEC14496-2.

Following the MPEG methods, an encoding method called JVT (Joint Video Team) encoding method (H.264/AVC (Advanced Video Coding) method) has been proposed to achieve a higher compression ratio. In the JVT method, as with the MPEG methods, motion prediction and motion compensation are performed on the basis of motion vectors in encoding of moving images.

The JVT method supports a weighted prediction mode which allows motion compensation in a fade-out/in effect, in which an image gradually disappears or appears or in a cross fade effect in which a scene is gradually changed by means of a combination of fade-out and fade-in, which are difficult by motion prediction based on motion vectors. Use of the weighted prediction mode according to the JVT method allows it to encode a moving image in a fade period without producing significant degradation in image quality.

In the weighted prediction mode, when prediction is performed for a P-picture or a B-picture of a moving image in producing of a predicted image, pixel values of a reference image are weighted. The weighted prediction mode has two sub-modes: an explicit weighted prediction mode in which weighting factors for B-pictures are explicitly specified; and an implicit weighted prediction mode in which weighting factors are automatically determined in accordance with difference in time from a reference image.

SUMMARY OF THE INVENTION

However, in the techniques described above, it is difficult for an encoder to know whether a given moving image includes a fade period. This makes it difficult to take advantage of the weighted prediction mode. That is, when an image encoded by the encoder is decoded by a decoder, a significant degradation in image quality occurs in the decoded moving image.

In the case where a moving image is encoded in the weighted prediction mode, in particular when a P-picture is encoded in the weighted prediction mode and when a B-picture is encoded in the explicit weighted prediction mode, a reduction in coding efficiency occurs in a normal period other than fade periods. This means that simple use of the weighted prediction mode for an entire moving image results in a reduction in coding efficiency.

In view of the above, it is desirable to provide a method of encoding a moving image with high efficiency without producing significant degradation in image quality.

According to an embodiment of the present invention, there is provided an image processing system including a decoder configured to decode an encoded image and an encoder configured to encode the image decoded by the decoder, wherein the decoder includes decoding means for decoding the encoded image, and detection means for detecting, on the basis of the image, a fade period included in the image and supplying a fade information signal indicating a detection result to the encoder, and the encoder includes acquisition means for acquiring the fade information signal, and changing means for changing a process performed in the encoding of the image in accordance with the fade information signal.

The detection means may detect the fade period on the basis of the number of intra-coded P-pictures and B-pictures in the given encoded image.

The detection means may detect the fade period on the basis of a change in luminance of successive image frames of the image.

According to an embodiment of the present invention, there is provided an image processing method for an image processing system including a decoder configured to decode an encoded image and an encoder configured to encode the image decoded by the decoder, the method comprising the steps of, in the decoder, decoding the encoded image, and detecting, on the basis of the image, a fade period included in the image and supplying a fade information signal indicating a detection result to the encoder, in the encoder, acquiring the fade information signal, and changing a process performed in the encoding or the image in accordance with the fade information signal.

In the above-described embodiments of the invention, the image processing system includes the decoder configured to decode an encoded image and the encoder configured to encode the image decoded by the decoder. In the decoder, the encoded image is decoded, and a fade period included in the image is detected on the basis of the image and a fade information signal indicating a detection result is supplied to the encoder. In the encoder, the fade information signal is acquired, and the process performed in the encoding of the image is changed in accordance with the fade information signal.

According to an embodiment of the present invention, there is provided a decoder including decoding means for decoding an encoded image, and detection means for detecting, on the basis of the image, a fade period included in the image and supplying a fade information signal indicating a detection result to an encoder configured to encode the decoded image such that a process performed in encoding of the decoded image is changed in accordance with the fade information signal.

The detection means may detect the fade period on the basis of the number of intra-coded P-pictures and B-pictures in the given encoded image.

The detection means may detect the fade period on the basis of a change in luminance of successive image frames of the image.

According to an embodiment of the invention, there is provided a decoding method/program including the steps of decoding an encoded image, and detecting, on the basis of the image, a fade period included in the image and supplying a fade information signal indicating a detection result to an encoder configured to encode the decoded image such that a process performed in encoding of the decoded image is changed in accordance with the fade information signal.

In the decoder and decoding method/program described above, the encoded image is decoded, and a fade period included in the image is detected on the basis of the image and the fade information signal indicating a detection result is supplied to the encoder configured to encode the decoded image such that the process performed in encoding of the decoded image is changed in accordance with the fade information signal.

According to an embodiment of the present invention, there is provided an encoder including acquisition means for acquiring a fade information signal indicating whether the current image to be encoded is in a fade period, and changing means for changing a process performed in the encoding of the image in accordance with the fade information signal.

If the current image to be encoded is in a fade period, the changing means may change the process performed on the image in the motion compensation.

The changing means may change the process performed in the motion compensation such that if the current image is a P-picture in a fade period, the changing means changes a mode associated with weighting of prediction in the motion compensation into a weighted prediction mode.

The changing means may change the process performed in the motion compensation such that if the current image is a B-picture in a fade period, the changing means changes a mode associated with weighting of prediction in the motion compensation into an explicit weighted prediction mode or an implicit weighted prediction mode.

The encoder may further include generation means for generating a forward-predicted image by performing the motion compensation in the forward prediction mode and generating a backward-predicted image by performing the motion compensation in the backward prediction mode, wherein the changing means may change the process performed in the motion compensation such that when a B-picture in a fade period is given as the current image, if the difference between a prediction residual given by the difference between the forward-predicted image and the current image and a prediction residual given by the difference between the backward-predicted image and the current image is less than a predetermined threshold value, the changing means changes the motion compensation mode of the motion compensation into a bidirectional prediction mode.

The changing means may change the process performed in the motion compensation such that if the current image is a B-picture in a fade period, the changing means changes the motion compensation mode of the motion compensation into a bidirectional prediction mode.

If the current image is in a fade period, the changing means may change a GOP (Group Of Pictures) structure of the image.

The GOP structure may be changed so as to include one or more P-pictures and one or more I-pictures.

The GOP structure may be changed so as to include one B-picture between adjacent two P-pictures.

The GOP structure may foe changed so as to include two B-pictures between adjacent two P-pictures.

The changing means may change a bit rate assigned to the image in encoding of the image.

If the current, image is in a fade period, the changing means may change the bit rate so as to be greater than a predetermined value.

The changing means may change the bit rate such that when the current image is not in any fade period, if the total amount of code of an already encoded image is greater than a target value, the changing means changes the bit rate such that the bit rate of an image to be encoded.

The changing means may change a weighting factor matrix by which coefficients obtained as a result of an orthogonal transformation of the image are weighted depending on frequencies of the coefficients when the coefficients are quantized.

If the current image is in a fade period, the changing means may change the weighting factor matrix used in the quantization of the coefficients such that weighting factors for coefficients of frequencies higher than a predetermined frequency are greater than predetermined weighting factors, and weighting factors for coefficients of frequencies lower than the predetermined frequency are smaller than the predetermined weighting factors.

If the current image is in a fade period, the changing means may change the weighting factor matrix used in the quantization of the coefficients such that weighting factors for coefficients of frequencies higher than a predetermined frequency are equal to predetermined weighting factors, and weighting factors for coefficients of frequencies lower than the predetermined frequency are smaller than the predetermined weighting factors.

If the current image is in a fade period, the changing means may change the weighting factor matrix used in the quantization of the coefficients such that weighting factors for coefficients of frequencies higher than a predetermined frequency are greater than predetermined weighting factors, and weighting factors for coefficients of frequencies lower than the predetermined frequency are equal to the predetermined weighting factors.

According to an embodiment of the invention, there is provided an encoding method/program including the steps of acquiring a fade information signal indicating whether a current image to be encoded is in a fade period, and changing a process performed in the encoding of the image in accordance with the fade information signal.

In the encoder and the encoding method/program described above, a fade information signal indicating whether a current image to be encoded is in a fade period is acquired, and the process performed in the encoding of the image is changed in accordance with the fade information signal.

As described above, the present invention provides great advantages. That is, it is possible to encode an image with high efficiency without producing significant degradation in image quality.

Furthermore, a fade information signal is provided which allows an image to be decoded with high efficiency without producing significant degradation in image quality.

BRIEF DESCRIPTION OF THE DRAWINGS

FIG. 16 is a flow chart illustrating a transcoding process;

FIG. 17 is a block diagram illustrating an example of a configuration of a decoder according to an embodiment of the present invention;

FIG. 18 is a diagram illustrating an example of a configuration of an image processing system; and FIG. 13 is a block diagram illustrating an example of a configuration of a personal computer.

DESCRIPTION OF THE PREFERRED EMBODIMENTS

Before describing an embodiment of the present invention, the correspondence between the features of the invention and the specific elements disclosed in an embodiment of the present invention is discussed below. This description is intended to assure that embodiments supporting the invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the invention, that does not necessarily mean that the element does not relate to other features of the invention.

Figure 3:
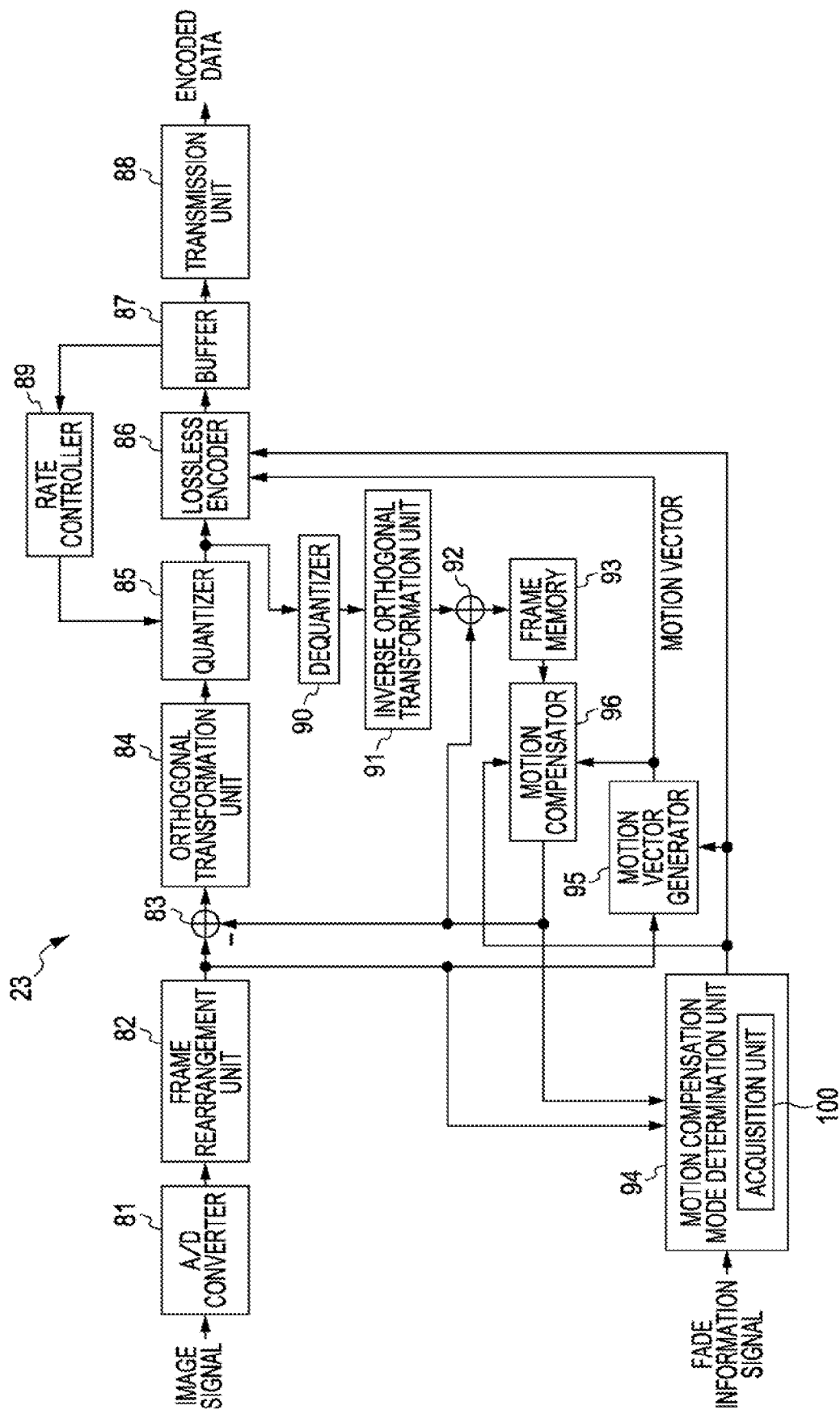
FIG. 3 is a block diagram illustrating an example of a configuration of an encoder according to an embodiment of the present invention.
Figure 15:
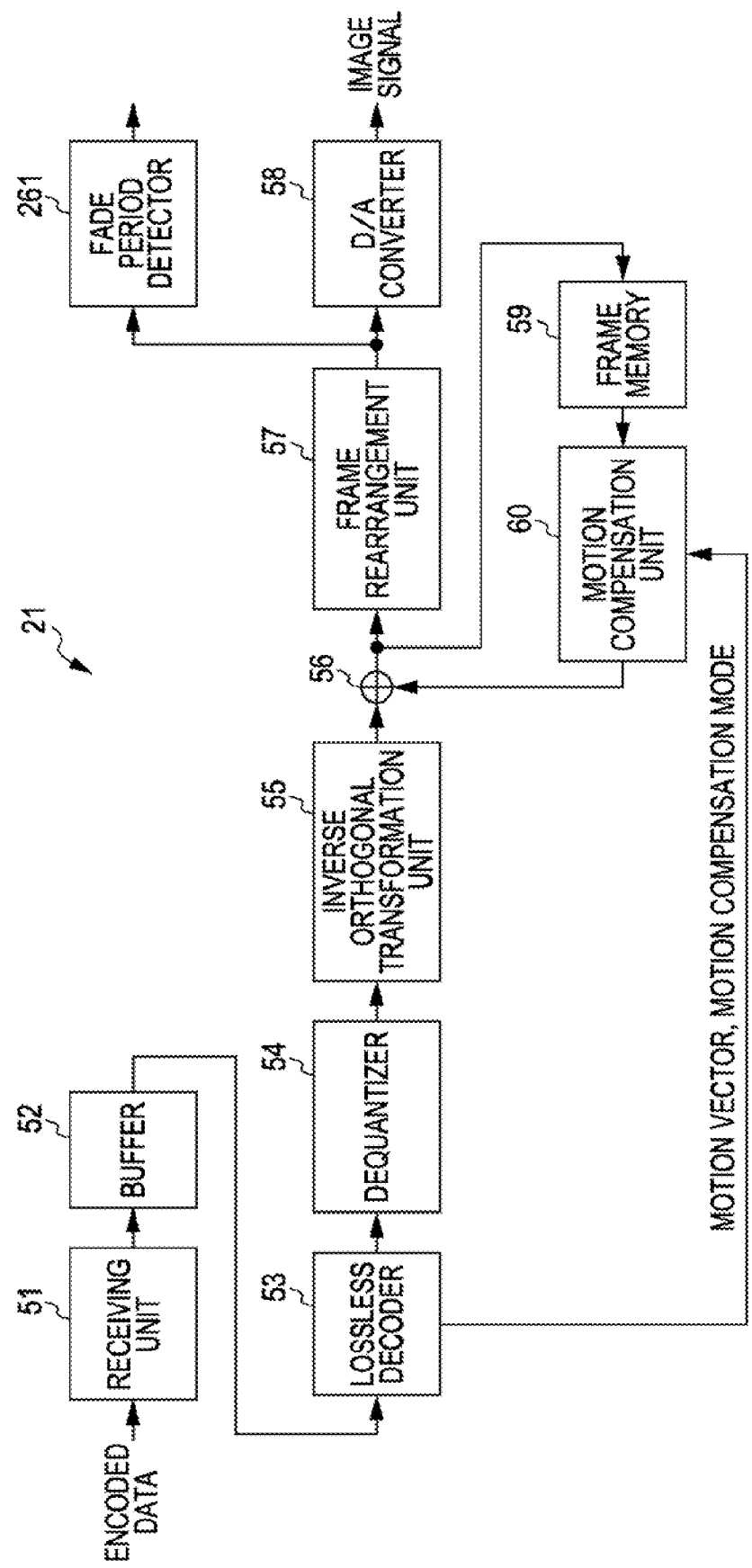
FIG. 15 is a block diagram illustrating an example of a configuration of a decoder according to an embodiment of the present invention.

According to an embodiment of the present invention, there is provided an image processing system including a decoder (for example, a decoder 21 shown in FIG. 1) configured to decode an encoded image and an encoder (for example, an encoder 23 shown in FIG. 1) configured to encode the image decoded by the decoder, wherein the decoder includes decoding means (for example, units denoted by reference numerals 53 to 60 in FIG. 15, i.e., units from a lossless decoder 53 to motion compensation unit 60) for decoding the encoded image, and detection means (for example, a fade period detector 261 shown in FIG. 15) for detecting, on the basis of the image, a fade period included in the image and supplying a fade information signal indicating a detection result to the encoder, and the encoder includes acquisition means (for example, an acquisition unit 100 shown in FIG. 3) for acquiring the fade information signal, and changing means (for example, a motion compensation determination unit 94 shown in FIG. 3) for changing a process performed in the encoding of the image in accordance with the fade information signal.

The detection means (for example, a fade period detector 261 shown in FIG. 17) may detect the fade period on the basis of the number of infra-coded P-pictures and B-pictures in the given encoded image.

The detection means may detect the fade period on the basis of a change in luminance of successive image frames of the image (for example, in step S254 in FIG. 16).

Figure 6:
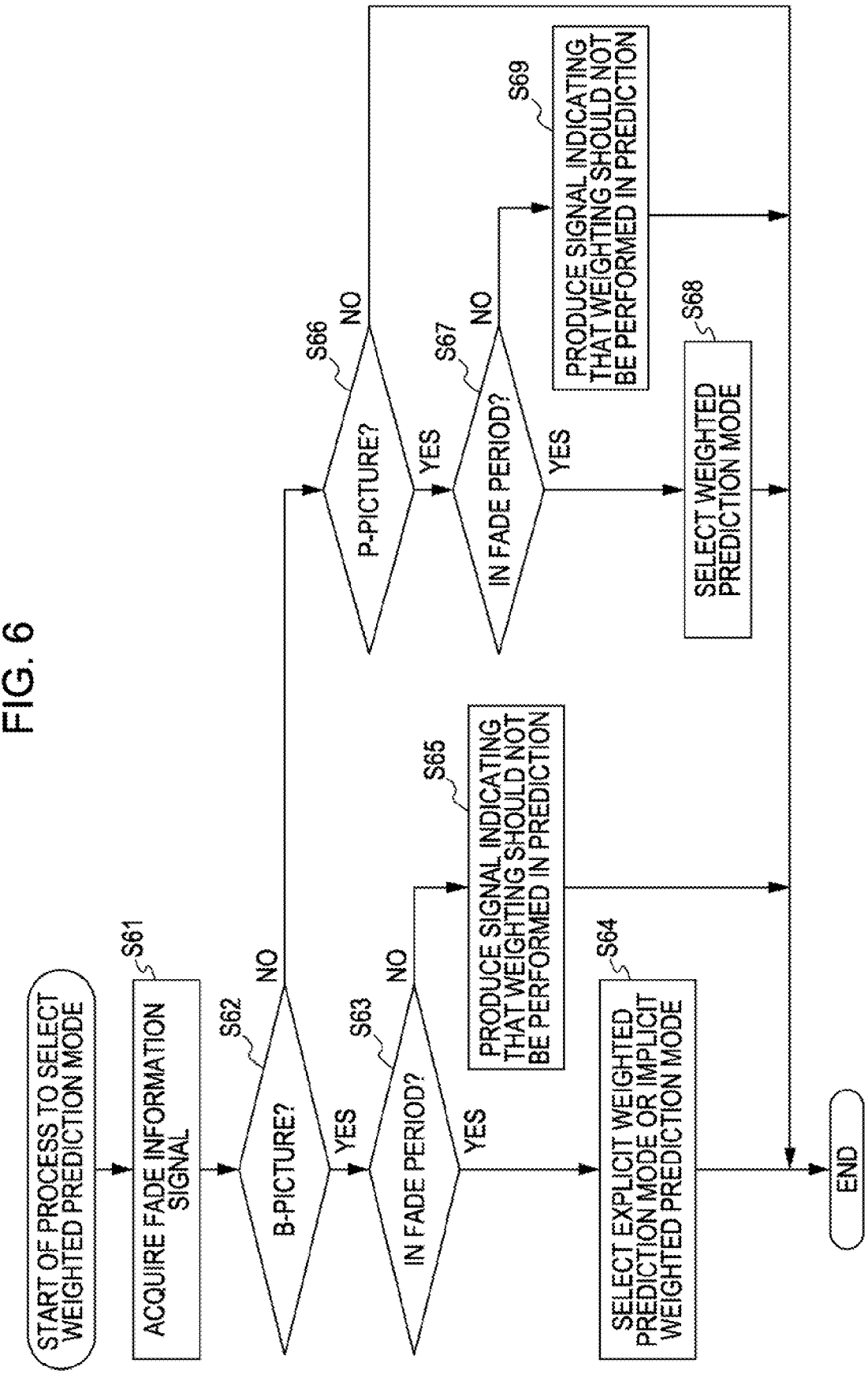
FIG. 6 is a flow chart illustrating a weighted prediction mode selection process.

According to an embodiment of the present invention, there is provided an image processing method for an image processing system including a decoder (for example, a decoder 21 shown in FIG. 1) configured to decode an encoded image and an encoder (for example, an encoder 23 shown in FIG. 1) configured to encode the image decoded by the decoder, wherein the method includes the steps of, in the decoder, decoding the encoded image (for example, in step S252 in FIG. 16), and detecting, on the basis of the image, a fade period included in the image and supplying a fade information signal indicating a detection result to the encoder (for example, in steps S254 and S255 in FIG. 16), in the encoder, acquiring the fade information signal (for example, in step S61 in FIG. 6), and changing a process performed in the encoding of the image in accordance with the fade information signal (for example, in steps S64 and S68 in FIG. 6).

According to an embodiment of the present invention, there is provided a decoder including decoding means (for example, units denoted by reference numerals 53 to 60 in FIG. 15, i.e., units from a lossless decoder 53 to motion compensation unit 60) for decoding an encoded image, and detection means for detecting, on the basis of the image, a fade period included in the image and supplying a fade information signal indicating a detection result to an encoder (for example, a fade period detector 261 shown in FIG. 15) configured to encode the decoded image such that a process performed in encoding of the decoded image is changed in accordance with the fade information signal.

The detection means (for example, a fade period detector 261 shown in FIG. 17) may detect the fade period on the basis of the number of intra-coded P-pictures and B-pictures in the given encoded image.

The detection means may detect the fade period on the basis of a change in luminance of successive image frames of the image (for example, in step S254 shown in FIG. 16).

According to an embodiment of the invention, there is provided a decoding method/program including the steps of decoding an encoded image (for example, in step S252 in FIG. 16), and detecting, on the basis of the image, a fade period included in the image and supplying a fade information signal indicating a detection result to an encoder configured to encode the decoded image such that a process performed in encoding of the decoded image is changed in accordance with the fade information signal (for example, in steps S254 and S255 in FIG. 16).

According to an embodiment of the present invention, there is provided an encoder including acquisition means (for example, an acquisition unit 100 shown in FIG. 3) for acquiring a fade information signal indicating whether a current image to be encoded is in a fade period, and changing means (for example, a motion compensation determination unit 94 shown in FIG. 3) for changing a process performed in the encoding of the image in accordance with the fade information signal.

The changing means may change the process performed in the motion compensation such that if the current image to be encoded is in a fade period, the changing means changes the process performed on the image in the motion compensation (for example, in steps S64 and S68 in FIG. 6).

The changing means may change the process performed in the motion compensation such that if the current image is a P-picture in a fade period, the changing means changes a mode associated with weighting of prediction in the motion compensation into a weighted prediction mode (for example, in step S68 in FIG. 6).

The changing means may change the process performed in the motion compensation such that if the current image is a B-picture in a fade period, the changing means changes a mode associated with weighting of prediction in the motion compensation into an explicit weighted prediction mode or an implicit weighted prediction mode (for example, in step S64 in FIG. 6).

Figure 8:
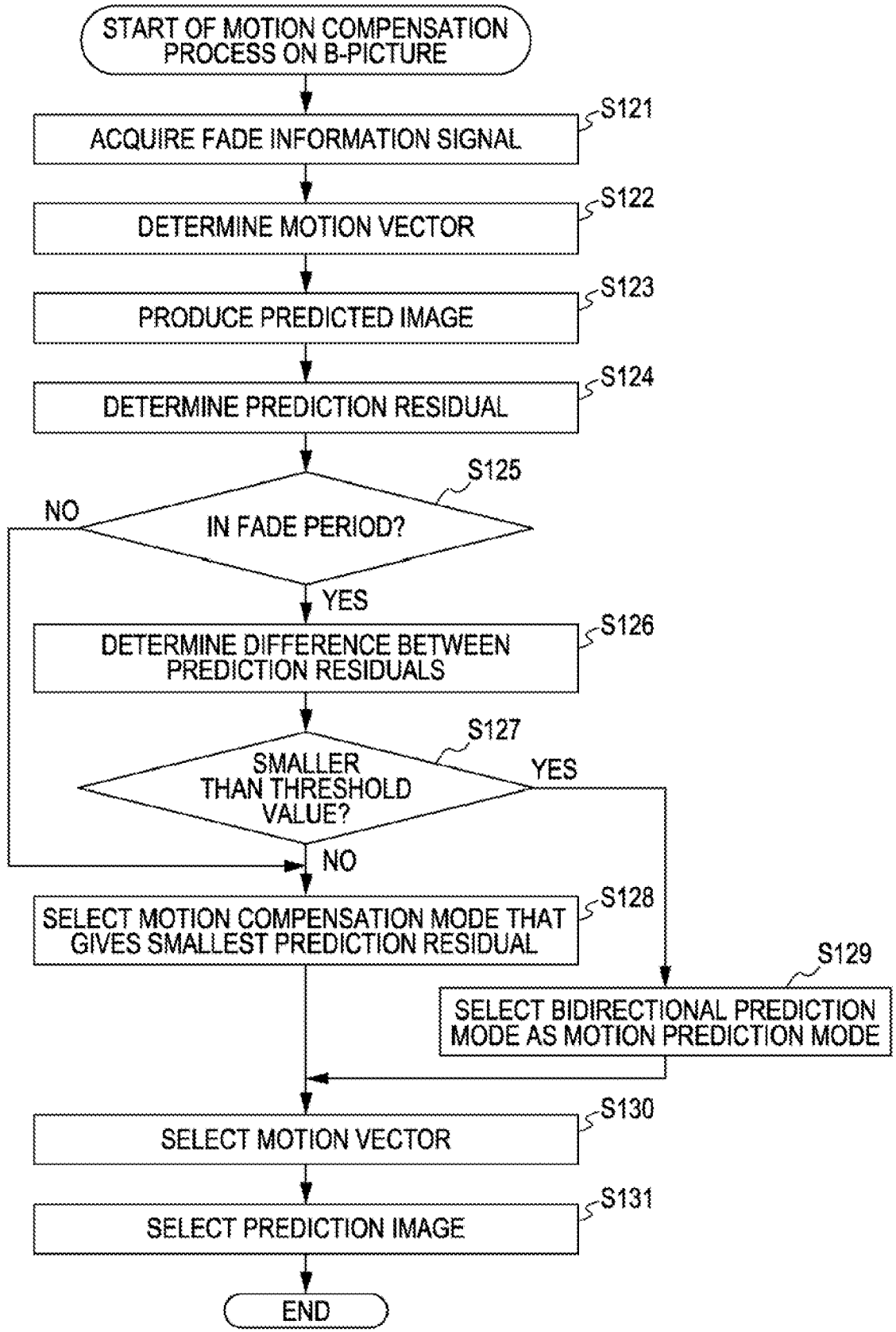
FIG. 8 is a flow chart illustrating a motion compensation process on a B-picture.

The encoder may further include generation means (for example, a motion compensation unit 96 shown in FIG. 3) for generating a forward-predicted image by performing the motion compensation in the forward prediction mode and generating a backward-predicted image by performing the motion compensation in the backward prediction mode, wherein the changing means may change the process performed in the motion compensation such that when a B-picture in a fade period is given as the current image, if the difference between a prediction residual given by the difference between the forward-predicted image and the current image and a prediction residual given by the difference between the backward-predicted image and the current image is less than a predetermined threshold value, the changing means changes the motion compensation mode of the motion compensation into a bidirectional prediction mode (for example, in step S129 in FIG. 8).

If the current image is in a fade period, the changing means (for example, a frame rearrangement unit 161 shown in FIG. 9) may change a GOP (Group Of Pictures) structure of the image.

The changing means (for example, a rate controller 191 shown in FIG. 11) may change a bit rate assigned to the image in encoding of the image.

Figure 12:
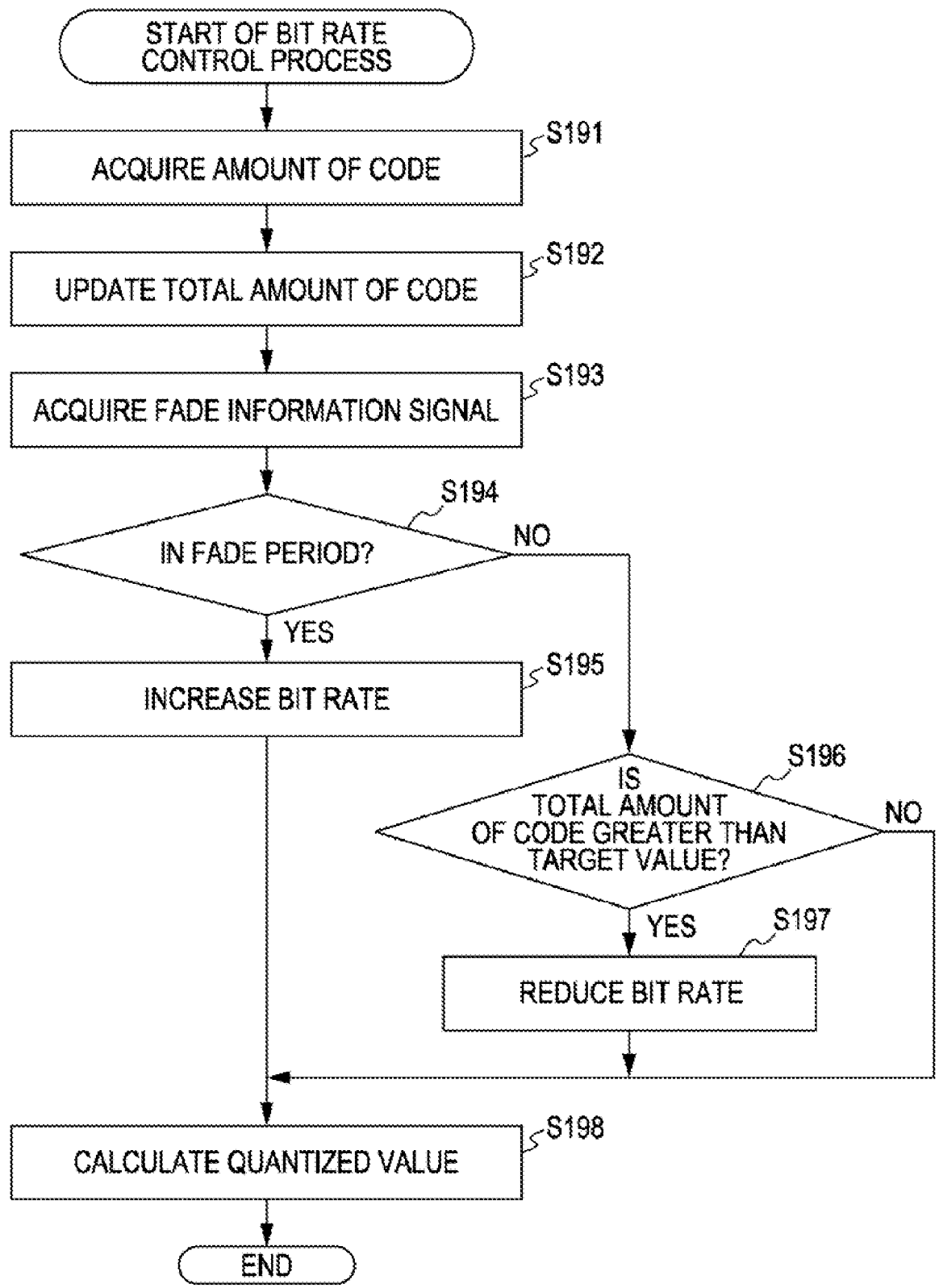
FIG. 12 is a flow chart illustrating a bit rate control process.

If the current image is in a fade period, the changing means may change the bit rate so as to be greater than a predetermined value (for example, in step S195 in FIG. 12).

The changing means may change the bit rate such that when the current image is not in any fade period, if the total amount of code of an already encoded image is greater than a target value, the changing means changes the bit rate such that the bit rate of an image to be encoded (for example, in step S197 in FIG. 12).

The changing means (for example, a quantizer 221 shown in FIG. 13) may change a weighting factor matrix by which coefficients obtained as a result of an orthogonal transformation of the image are weighted depending on frequencies of the coefficients when the coefficients are quantized.

According to an embodiment of the invention, there is provided an encoding method/program including the steps of acquiring a fade information signal indicating whether a current image to be encoded is in a fade period (for example, in step S61 in FIG. 6), and changing a process performed in the encoding of the image in accordance with the fade information signal (for example, in steps S64 and S68 in FIG. 6).

The present invention may be applied to an encoder for encoding a moving image, for example, by the MPEG-2 method or the JVT method, and to a decoder for decoding a moving image encoded by the MPEG-2 method or the JVT method.

Specific embodiments of the present invention are described below with reference to the accompanying drawings.

Figure 1:
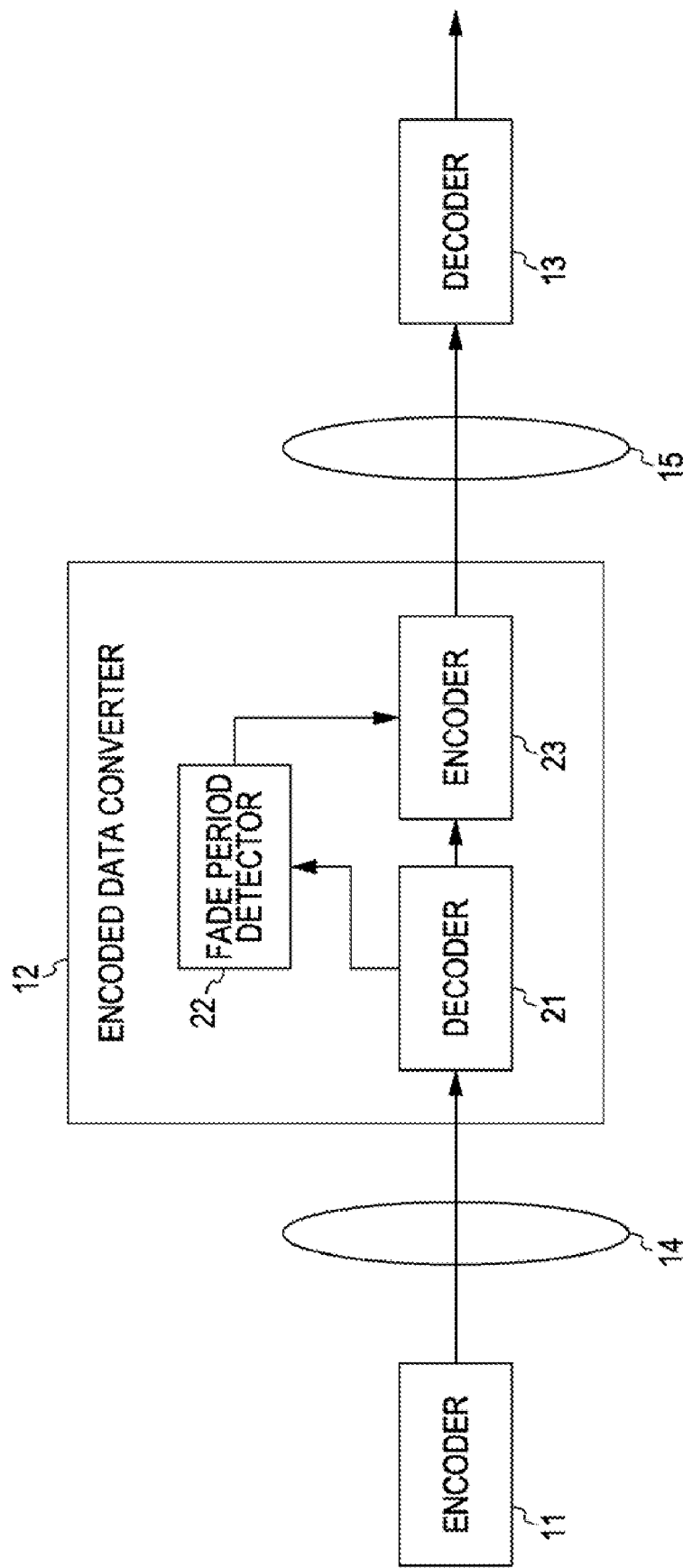
FIG. 1 is a diagram illustrating an image processing system according to an embodiment of the present invention.

FIG. 1 shows an example of a configuration of an image processing system according to an embodiment of the present invention. The image processing system includes an encoder 11, an encoded data converter 12, and a decoder 13.

In this image processing system, the encoder 11 and the encoded data converter 12 are connected to each other via a communication network 14 such as a satellite broadcast network, a cable television broadcast network, a telephone network, a portable telephone network, or the Internet. The encoded data converter 12 and the decoder 13 are connected to each other via a communication network 15 such as a satellite broadcast network, a cable television broadcast network, a telephone network, a portable telephone network, or the Internet.

The encoder 11 encodes a moving image (hereinafter, also referred to simply as an image if no confusion occurs) by a particular encoding method. The encoder 11 modulates the encoded image in the form of a bit stream data and transmits the resultant modulated data to the encoded data converter 12 via the communication network 14.

If the encoded data converter 12 receives the data from the encoder 11 via the communication network 14, the encoded data converter 12 demodulates the data and further decodes the demodulated data into an image. In accordance with a request issued by the decoder 13, the encoded data converter 12 converts the decoded image into an image encoded by an encoding method different from that used by the encoder 11 or into an image with a frame size different from the original size.

The encoded data converter 12 transmits the resultant converted data to the decoder 13 via the communication network 15. If the decoder 13 receives the data from the encoded data converter 12, the decoder 13 decodes the data into an image and uses the resultant image, for example, by displaying the image.

The encoded data converter 12 includes a decoder 21, a fade period detector 22, and an encoder 23. The decoder 21 decodes data received from the encoder 11 and supplies an image obtained as a result of the decoding to the fade period detector 22 and the encoder 23.

The fade period detector 22 detects a fade period from the image supplied from the decoder 21 and supplies a fade information signal indicating a detection result to the encoder 23. The fade period refers to a period in which an image is faded out (that is, the image gradually disappears) or faded in (that is, the image gradually appears), or the image is cross-faded (that is, a scene is gradually changed by a combination of fading-in and fading-out). In other words, in a moving image, a period in which a great change in luminance occurs continuously over temporally successive frame images is called a fade period. Hereinafter, frames of a moving image, i.e., pictures will also be referred to as frame images. When it is not necessary to distinct between a moving image and a frame image, a term "image" will be used.

The encoder 23 encodes the image supplied from the decoder 21 in accordance with the fade information signal supplied from the fade period detector 22. More specifically, the encoder 23 changes the process performed in encoding of the image in accordance with the fade information signal, and encodes the image by performing the changed process.

In the embodiment described above, the encoded image is transmitted to the encoded data converter 12 via the communication network 14. Alternatively, an encoded image may be recorded on a recording medium such as an optical disk, a magnetic disk, or a semiconductor memory, and the encoded image may be supplied to the encoded data converter 12 by reading the encoding image from the recording medium. The image encoded by the encoded data converter 12 may be recorded on a recording medium, and the encoded image may be supplied to the decoder 13 by reading the encoded image from the recording medium.

Figure 2:
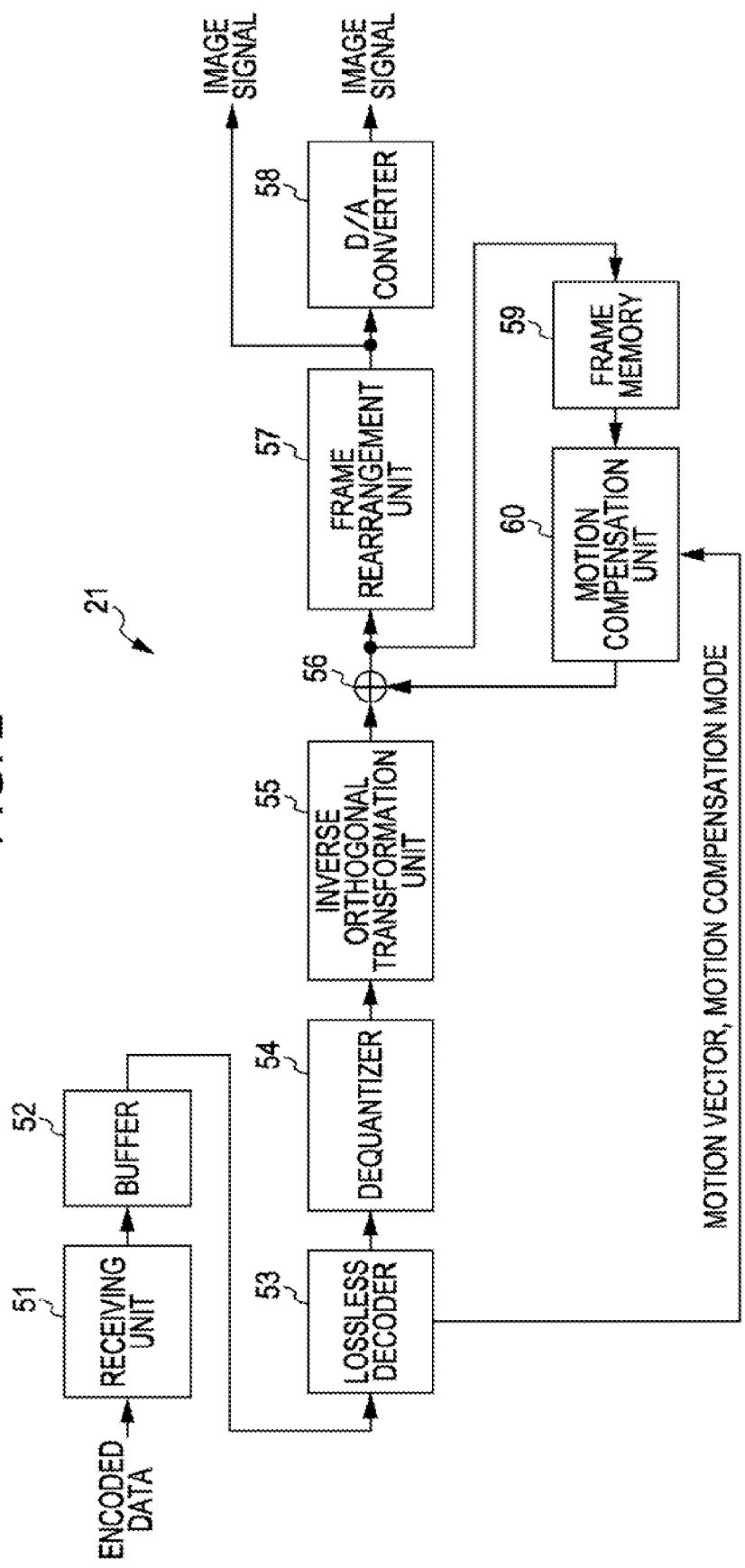
FIG. 2 is a block diagram illustrating an example of a configuration of a decoder according to an embodiment of the present invention.

FIG. 2 is a block diagram showing an example of a configuration of the decoder 21 shown in FIG. 1.

The decoder 21 includes a receiving unit 51, a buffer 52, a lossless decoder 53, a dequantizer 54, an inverse orthogonal transformation unit 55, an adder 56, a frame rearrangement unit 57, a D/A (digital-to-analog) converter 58, a frame memory 59, and a motion compensation unit 60.

The receiving unit 51 receives the image transmitted from the encoder 11 and supplies the received image to the buffer 52. The buffer 52 temporarily stores the image received from the receiving unit 51 and supplies the image to the lossless decoder 53. The lossless decoder 53 performs variable-length decoding or arithmetic decoding on the image stored in the buffer 52 in accordance with the format specified by the image compression information, and the lossless decoder 53 supplies quantized transform coefficients obtained as a result of the decoding process to the dequantizer 54. In a case where an inter-coded frame image is given, the lossless decoder 53 also decodes a motion vector, a motion compensation mode, etc., stored in the header of the image and supplies the resultant decoded data to the motion compensation unit 60.

The dequantizer 54 dequantizes the quantized transform coefficients supplied from the lossless decoder 53 and supplies the resultant dequantized transform coefficients to the inverse orthogonal transformation unit 55. The inverse orthogonal transformation unit 55 performs an inverse orthogonal transformation such as an inverse discrete cosine transform or an inverse Karhunen-Loeve transformation on the transform coefficients supplied from the dequantizer 54 in accordance with the format specified by the image compression information, and the inverse orthogonal transformation unit 55 supplies the resultant obtained image to the adder 56.

In the case where the image supplied from the inverse orthogonal transformation unit 55 is an intra-coded image, the adder 56 directly supplies the image received from the inverse orthogonal transformation unit 55 to the frame rearrangement unit 57 and the frame memory 59. On the other hand, in the case where the image supplied from the inverse orthogonal transformation unit 55 is an inter-coded image, the adder 56 adds the image supplied from the inverse orthogonal transformation unit 55 and the image supplied from the motion compensation unit 60, and the adder 56 supplies the resultant image to the frame rearrangement unit 57 and the frame memory 59.

The frame rearrangement unit 57 rearranges frames of the image supplied from the adder 56 in accordance with a GOP (Group of Picture) structure of the image and supplies the resultant rearranges frames of the image to the D/A converter 58 and the fade period detector 22. The D/A converter 58 converts the image signal received from the frame rearrangement unit 57 from digital form into analog form, and supplies the resultant analog image signal to the encoder 23.

The motion compensation unit 60 performs motion compensation on the basis of the image stored in the frame memory 59 and the motion vector supplied from the lossless decoder 53 in accordance with the motion compensation mode, and the motion compensation unit 60 supplies an image obtained as a result of the motion compensation to the adder 56.

The decoder 21 shown in FIG. 2 is configured in a similar manner to the decoder 13 shown in FIG. 1, and thus a duplicated explanation thereof is omitted. Note that in the decoder 13, the image rearranged by the frame rearrangement unit is supplied only to the D/A converter and is not supplied to the fade period detector.

FIG. 3 is a block diagram showing an example of a configuration of the encoder 23 shown in FIG. 1.

The encoder 23 includes an A/D converter 81, a frame rearrangement unit 82, an adder 83, an orthogonal transformation unit 84, a quantizer 85, a lossless encoder 86, a buffer 87, a transmission unit 88, a rate controller 89, a dequantizer 90, an inverse orthogonal transformation unit 91, an adder 92, a frame memory 93, a motion compensation determination unit 94, a motion vector generator 95, and a motion compensation unit 96.

The A/D converter 81 converts an analog image signal supplied from the decoder 21 into digital image data and supplies the resultant digital image signal to the frame rearrangement unit 82. The frame rearrangement unit 82 rearranges frames of the image supplied from the A/D converter 81 in accordance with a GOP structure, and supplies the resultant rearranged frames of the image to the adder 83, the motion compensation determination unit 94, and the motion vector generator 95.

If the supplied image is an image to be infra-coded, the adder 83 directly supplies the image received from the frame rearrangement unit 82 to the orthogonal transformation unit 84. On the other hand, if the supplied image is an image to be inter-coded, the adder 83 subtracts the image supplied from the motion compensation unit 96 from the image supplied from the frame rearrangement unit 82, and supplies the resultant image to the orthogonal transformation unit 84.

The orthogonal transformation unit 84 performs an orthogonal transformation such as a discrete cosine transform or a Karhunen-Loeve transformation on the image supplied from the adder 83, and supplies resultant transform coefficients to the quantizer 85. The quantizer 85 quantizes the transform coefficients received from the orthogonal transformation unit 84, and supplies the resultant quantized transform coefficients to the lossless encoder 86 and the dequantizer 90.

The lossless encoder 86 performs lossless encoding such as variable-length encoding or arithmetic encoding on the transform coefficients supplied from the quantizer 85, and supplies the resultant encoded transform coefficients to the buffer 87, which stores the supplied encoded transform coefficients. The transmission unit 88 transmits the transform coefficients stored in the buffer 87, as the encoded image, to the decoder 13.

The rate controller 89 controls the bit rate indicating the amount of code per unit time assigned to the image to be encoded, that is, the amount of code assigned to each frame image of the moving image to be encoded, depending on the amount of code of the image stored in the buffer 87. In other words, the rate controller 89 controls the quantization value by which the transform coefficients are divided in the quantization process performed by the quantizer 85.

The dequantizer 90 dequantizes the transform coefficients supplied from the quantizer 85 and supplies the resultant dequantized transform coefficients to the inverse orthogonal transformation unit 91. The inverse orthogonal transformation unit 91 performs an inverse orthogonal transformation such as an inverse discrete cosine transform or an inverse Karhunen-Loeve transformation on the transform coefficients supplied from the dequantizer 90, in accordance with the format specified by the image compression information, and the inverse orthogonal transformation unit 91 supplies the image obtained as a result of the inverse orthogonal transformation to the adder 92.

If the adder 92 receives the image from the motion compensation unit 96, the adder 92 adds the image received from the motion compensation unit 96 and the image supplied from the inverse orthogonal transformation unit 91, and supplies the resultant image to the frame memory 93, which stores the supplied image. On the other hand, in the case where the adder 92 receives no image from the motion compensation unit 96, the adder 92 directly supplies the image received from the inverse orthogonal transformation unit 91 to the frame memory 93 to store it therein. The frame memory 93 stores the image supplied from the adder 92 as a reference image which will be referred to when motion compensation is performed. The reference image stored in the frame memory 93 is supplied to the motion compensation unit 96.

The motion compensation determination unit 94 includes an acquisition unit 100 configured to acquire a fade information signal from the fade period detector 22. In the case where the image is to be inter-coded, the motion compensation determination unit 94 selects a motion compensation mode or prediction mode in accordance with the fade information signal, and supplies a signal indicating the selected motion compensation mode or the prediction mode to the lossless encoder 86, motion vector generator 95, and motion compensation unit 96.

Note that the motion compensation mode refers to an image prediction method used in motion compensation. As for the motion compensation mode, one mode is selected from a group including a forward prediction mode in which prediction is performed in a forward direction, a backward prediction mode in which prediction is performed in a backward direction, and a bidirectional prediction mode in which prediction is performed bidirectionally. The prediction mode refers to a weighting method used in the motion compensation. When weighted prediction is performed in the motion compensation, the prediction mode is selected from a group including an explicit weighted prediction mode or an implicit weighted prediction mode is selected as the prediction mode when a B-picture is being subjected to the motion compensation, while a weighted prediction mode is selected for a P-picture.

The motion vector generator 95 determines a motion vector and supplies the resultant motion vector to the motion compensation unit 96 and the lossless encoder 86. The motion compensation unit 96 performs the motion compensation using the motion vector supplied from the motion vector generator 95 and the reference image data stored in the frame memory 93, and the motion compensation unit 96 supplies predicted image data obtained as a result of the motion compensation to the adder 83, the motion compensation determination unit 94, and the adder 92.

Figure 4:
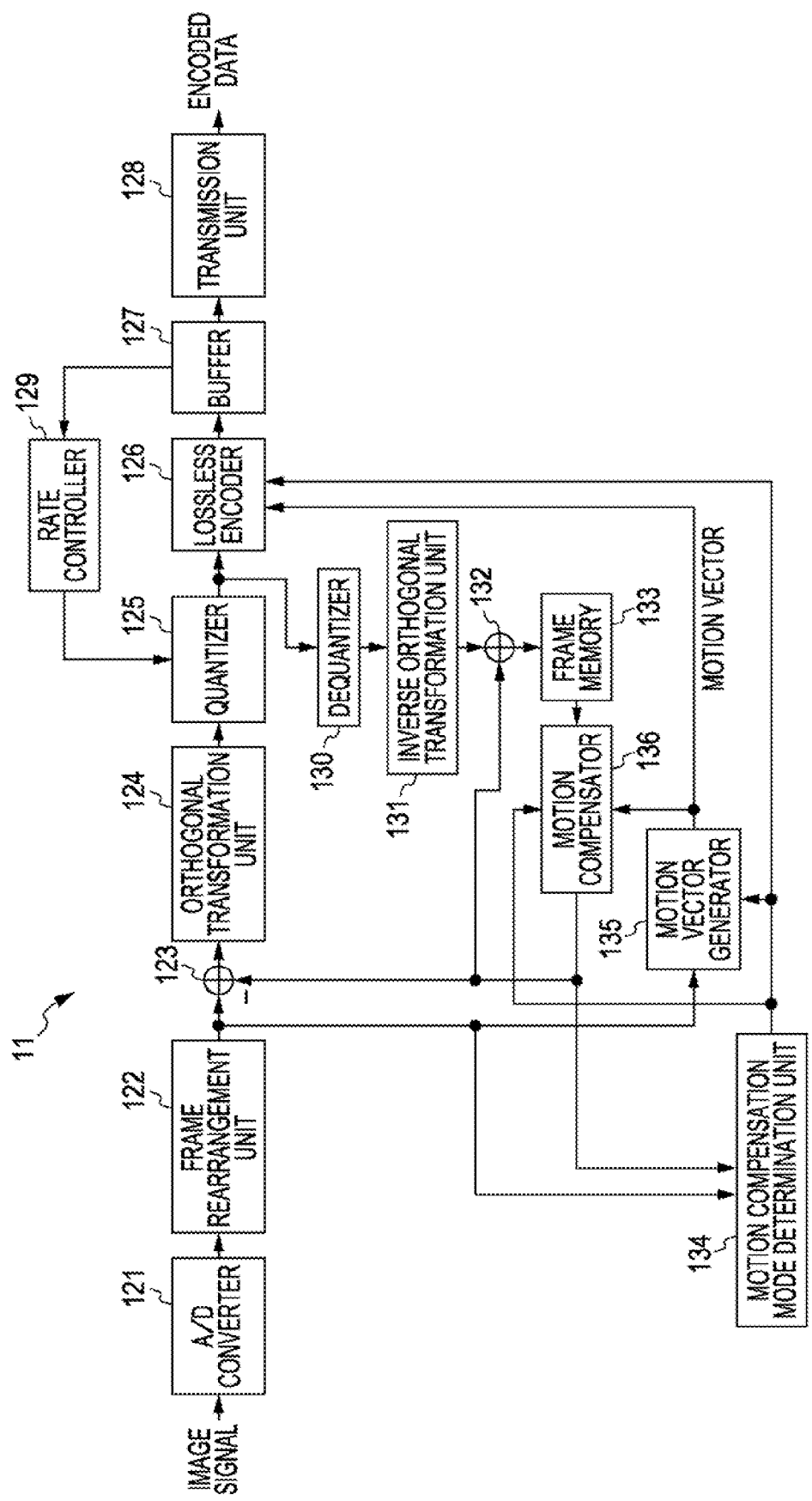
FIG. 4 is a block diagram illustrating an example of a configuration of an encoder according to an embodiment of the present invention.

FIG. 4 is a block diagram showing an example of a configuration of the encoder 11 shown in FIG. 1.

The encoder 11 includes an A/D converter 121, a frame rearrangement unit 122, an adder 123, an orthogonal transformation unit 124, a quantizer 125, a lossless encoder 126, a buffer 127, a transmission unit 128, a rate controller 129, a dequantizer 130, an inverse orthogonal transformation unit 131, an adder 132, a frame memory 133, a motion compensation determination unit 134, a motion vector generator 135, and a motion compensation unit 136.

In the encoder 11, units denoted by reference numerals 121 to 133 (that is, units from the A/D converter 121 to the frame memory 133), the motion vector generator 135, and the motion compensation unit 136 are similar to corresponding units in the encoder 23 shown in FIG. 3, that is, units from the A/D converter 81 to the frame memory 92, the motion vector generator 95, and the motion compensation unit 96, and thus a duplicated explanation thereof is omitted herein.

In the case where the image is to be inter-coded, the motion compensation determination unit 134 selects a motion compensation mode or a prediction mode based on the image supplied from the frame rearrangement unit 122 and the predicted image supplied from the motion compensation unit 136, and supplies a signal indicating the selected motion compensation mode or the prediction mode to the lossless encoder 126, the motion vector generator 135, and the motion compensation unit 136.

If the encoded data converter 12 receives the encoded image transmitted from the encoder 11, the encoded data converter 12 converts the format in terms of the encoding method and/or the frame size of the received image, and supplies the resultant data to the decoder 13. This process is called a transcoding process.

The transcoding process performed by the encoded data converter 12 including the decoder 21, the fade period detector 22, and the encoder 23 is described below with reference to a flow chart shown in FIG. 5.

In step S11, the receiving unit 51 of the decoder 21 receives the image transmitted from the encoder 11 via the communication network 14, and supplies the received image to the buffer 52.

In step S12, the decoder 21 decodes the received image. More specifically, the lossless decoder 53 performs processing such as variable-length decoding or arithmetic decoding on the image stored in the buffer 52 in accordance with the format specified by the image compression information, and supplies transform coefficients obtained as a result of the processing to the dequantizer 54.

The lossless decoder 53 also decodes a motion vector, a motion compensation mode, etc., stored in the header of the inter-coded frame image, and supplies resultant decoded data to the motion compensation unit 60. The dequantizer 54 dequantizes the transform coefficients supplied from the lossless decoder 53 and supplies the dequantized transform coefficients to the inverse orthogonal transformation unit 55. The inverse orthogonal transformation unit 55 performs an inverse orthogonal transformation such as an inverse discrete cosine transform or an inverse Karhunen-Loeve transformation on the transform coefficients supplied from the dequantizer 54 in accordance with the format specified by the image compression information, and supplies an image obtained as a result of the inverse orthogonal transformation to the adder 56.

In the case where the image supplied from the inverse orthogonal transformation unit 55 is an intra-coded image, the adder 56 directly supplies the image received from the inverse orthogonal transformation unit 55 to the frame rearrangement unit 57, and the frame memory 59. On the other hand, in the case where the image supplied from the inverse orthogonal transformation unit 55 is an inter-coded image, the adder 56 adds the image supplied from the inverse orthogonal transformation unit 55 and the image supplied from the motion compensation unit 60, and the adder 56 supplies the resultant image to the frame rearrangement unit 57, and the frame memory 59. The frame rearrangement unit 57 rearranges frames of the image supplied from the adder 56 in accordance with the GOP structure of the image. The motion compensation unit 60 performs motion compensation on the basis of the image stored in the frame memory 59 and the motion vector supplied from the lossless decoder 53 in accordance with the motion compensation mode, and the motion compensation unit 60 supplies a predicted image obtained as a result of the motion compensation to the adder 56.

If the image is decoded, then in step S13, the decoder 21 supplies the decoded image to the fade period detector 22 and the encoder 23. More specifically, the frame rearrangement unit 57 supplies the rearranged image to the fade period defector 22 and the D/A converter 58. The D/A converter 58 converts the image supplied from the frame rearrangement unit 57 from digital form into analog form and supplies the resultant analog image signal to the encoder 23.

If the fade period detector 22 receives the image from the decoder 21, then in step S21, the fade period detector 22 detects a fade period from the image received from the decoder 21. More specifically, for example, if the fade period detector 22 detects a frame-to-frame change in luminance greater than a predetermined threshold value over a continuous frame images in a period with a predetermined length, then the fade period detector 22 determines that the detected period of a fade period. That is, the fade period detector 22 determines the luminance of each frame image of the moving image, and detects a fade period on the basis of a change in the luminance of the successive frame images.

More specifically, the fade period detector 22 determines the luminance of each frame image by calculating the average of luminance values of respective pixel values of the frame image. The fade period detector 22 then calculates the difference of the determined luminance of the frame image of interest and the average of luminance values of three successive frame images immediately previous to the frame image of interest. If the difference is equal to or greater than a predetermined threshold value, then the fade period detector 22 determines that the frame image of interest is in a fade period.

In step S22, the fade period detector 22 produces a fade information signal indicating the result of the determination in terms of the fade period. The fade period detector 22 supplies the produced fade information signal to the encoder 23. Thus, the transcoding process is completed.

If the image and the fade information signal have been supplied from the decoder 21 and the fade period detector 22 to the encoder 23, then in step S31, the encoder 23 decodes the image supplied from the decoder 21 in accordance with the fade information signal.

More specifically, the A/D converter 81 of the encoder 23 converts the analog image signal received from the decoder 21 into a digital image signal and supplies the resultant digital image signal to the frame rearrangement unit 82. The frame rearrangement unit 82 rearranges frames of the image supplied from the A/D converter 81 in accordance with the GOP structure, and supplies the resultant rearranged image to the adder 83, the motion compensation determination unit 94, and the motion vector generator 95.

More specifically, the frame rearrangement unit 82 supplies the image and a picture type signal indicating the type of the image to the adder 83, the motion compensation determination unit 94, and the motion vector generator 95. The picture type of the image can be one of the followings: I-picture which is a frame image infra-coded without using any reference image; P-picture which is a frame image forward-predictable using one reference image; and B-picture which is a frame image birectionally-predictable using two reference image.

If the supplied image is an image to be intra-coded, the adder 83 directly supplies the image received from the frame rearrangement unit 82 to the orthogonal transformation unit 84. The orthogonal transformation unit 84 performs an orthogonal transformation such as a discrete cosine transform or a Karhunen-Loeve transformation on the image supplied from the adder 83, and supplies resultant transform coefficients to the quantizer 85.

The quantizer 85 quantizes the transform coefficients received from the orthogonal transformation unit 84, and supplies the resultant quantized transform coefficients to the lossless encoder 86 and the dequantizer 90. More specifically, for example, the quantizer 85 quantizes transform coefficients in units of pixel blocks each including, for example, 8×8 pixels or 4×4 pixels such that weighting is performed depending on the frequency of transform coefficients of pixels by using a weighting factor matrix (also called, a scaling list) and the quantization value supplied from the rate controller 89.

The lossless encoder 86 performs lossless encoding such as variable-length encoding or arithmetic encoding on the transform coefficients supplied from the quantizer 85, and supplies the resultant encoded transform coefficients to the buffer 87, which stores the supplied encoded transform coefficients.

On the other hand, if the supplied image is an image to be inter-coded, the motion compensation determination unit 94 selects a motion compensation mode or a prediction mode in accordance with the fade information signal supplied from the fade period detector 22, and supplies a signal indicating the selected motion compensation mode or the prediction mode to the lossless encoder 86, the motion vector generator 95, and the motion compensation unit 96.

The motion vector generator 95 determines a motion vector and supplies the resultant motion vector to the motion compensation unit 96 and the lossless encoder 86. The motion compensation unit 96 performs the motion compensation using the motion vector supplied from the motion vector generator 95 and the reference image data supplied from the frame memory 93, and the motion compensation unit 96 supplies a predicted image obtained as a result of the motion compensation to the adder 83 and the motion compensation determination unit 94. The adder 83 subtracts the predicted image supplied from the motion compensation unit 96 from the image supplied from the frame rearrangement unit 82, and supplies the resultant image to the orthogonal transformation unit 84.

If the orthogonal transformation unit 84 receives the image, the orthogonal transformation unit 84 performs the orthogonal transformation on the received image as with the intra-coded image. The resultant transform coefficients are supplied to the quantizer 85 and quantized thereby. The resultant quantized transform coefficients are encoded by the lossless encoder 86 and stored in the buffer 87. On the other hand, if the supplied image is an image to be inter-coded, the lossless encoder 86 performs lossless-encoding on the motion compensation mode and the prediction mode supplied from the motion compensation determination unit 94 and the motion vector supplied from the motion vector generator 95, and the lossless encoder 86 stores the resultant data in the header of the image.

After the image is encoded, in step S32, the transmission unit 88 transmits the image stored in the buffer 87 to the decoder 13 via the communication network 15. Thus, the transcoding process is completed.

Thus, the encoded data converter 12 converts the format of the received image in terms of the encoding method and/or the frame size as described above, and transmits the converted image to the decoder 13.

Referring to a flow chart shown in FIG. 6, a prediction mode selection process performed in step S31 in FIG. 5 by the motion compensation determination unit 94 in inter-coding of an image is described below.

The prediction mode selection process is performed in units of frames, i.e., in units of pictures of a moving image, and is started when one frame image of the moving image and data indicating the picture type of this frame image are supplied from the frame rearrangement unit 82 to the motion compensation determination unit 94. Note that the prediction mode selection process is performed when the image is encoded by an encoding method which allows weighting prediction.

In step S61, the acquisition unit 100 acquires a fade information signal from the fade period detector 22.

In step S62, the motion compensation determination unit 94 determines, based on the picture type of the image supplied from the frame rearrangement unit 82, whether the image, which has been supplied from the frame rearrangement unit 82 and which is going to be encoded, is a B-picture.

If it is determined in step S62 that the image is a B-picture, the process proceeds to step S63. In step S63, the motion compensation determination unit 94 determines, based on the fade information signal acquired by the acquisition unit 100, whether the image to be encoded is in a fade period.

If it is determined, in step S63 that the image is in a fade period, the process proceeds to step S64. In step S64, the motion compensation determination unit 94 selects the explicit weighted prediction mode or the implicit weighted prediction mode as the prediction mode to be employed in the motion compensation to produce a predicted image associated with the given image to be encoded.

The motion compensation determination unit 94 supplies a signal indicating the selected prediction mode to the lossless encoder 86, the motion vector generator 95, and the motion compensation unit 96. Thus, the prediction mode selection process is completed. Note that in step S64 described above, the selection of the prediction mode from the explicit weighted prediction mode and the implicit weighted prediction mode may be made automatically in a predetermined rule or may be made in accordance with a command issued by a user who is operating the encoder 23.

On the other hand, in the case in which it is determined in step S63 that the image is not in a fade period, the process proceeds to step S65. In step S65, the motion compensation determination unit 94 generates a signal indicating that no weighting is used in the motion convention performed in producing the predicted image to be encoded, and the motion compensation determination unit 94 supplies the generated signal indicating that no weighting should be performed in the prediction to the lossless encoder 86, the motion vector generator 95, and the motion compensation unit 96. If the signal is sent, the prediction mode selection process is completed.

In the case where it is determined in step S62 that the image is not a B-picture, the process proceeds to step S66. In step S66, the motion compensation determination unit 94 determines whether the image supplied from the frame rearrangement unit 82 is a P-picture, based on the picture type of the image supplied from the frame rearrangement unit 82.

If it is determined in step S66 that the image is a P-picture, the process proceeds to step S67. In step S67, the motion compensation determination unit 94 determines, based on the fade information signal, whether the image to be encoded is in a fade period.

If it is determined in step S67 that the image is in a fade period, the process proceeds to step S68. In step S68, the motion compensation determination unit 94 selects the weighted prediction mode as the mode associated with weighting of prediction in the motion compensation performed to produce a predicted image associated with the image to be encoded.

The motion compensation determination unit 94 supplies data indicating the selected prediction mode to the lossless encoder 86, the motion vector generator 95, and the motion compensation unit 96. If the data is sent, the prediction mode selection process is completed.

On the other hand, in the case where it is determined in step S67 that the image is not in a fade period, the process proceeds to step S69. In step S69, the motion compensation determination unit 94 generates a signal indicating that no weighting is used in the motion convention performed in producing the predicted image to be encoded, and the motion compensation determination unit 94 supplies the generated signal indicating that no weighting should be performed in the prediction to the lossless encoder 86, the motion vector generator 95, and the motion compensation unit 96. If the signal is sent, the prediction mode selection process is completed.

If it is determined in step S66 that the image is not a P-picture, that is, if the image is an I-picture which is to be intra-coded, the prediction mode selection process is ended without performing the selection.

As described above, the motion compensation determination unit 94 selects a prediction mode based on the picture type of the image to be encoded and depending on whether the image is in a fade period.

By selecting a prediction mode based on the picture type of the image to be encoded and depending on whether the image is in a fade period in the above-described manner, it is possible to perform high-efficiency encoding even on an image in a fade period without creating significant degradation in image quality.

In general, in encoding of P-pictures or B-pictures in a fade period, it is possible to also predict a change in luminance of images by performing weighted prediction, which allows an improvement in subjective image quality. In view of the above, it is possible to achieve high encoding efficiency without producing significant degradation in image quality by performing weighting prediction for images in a fade period but performing no weighting for images in a normal period.

Figure 5:
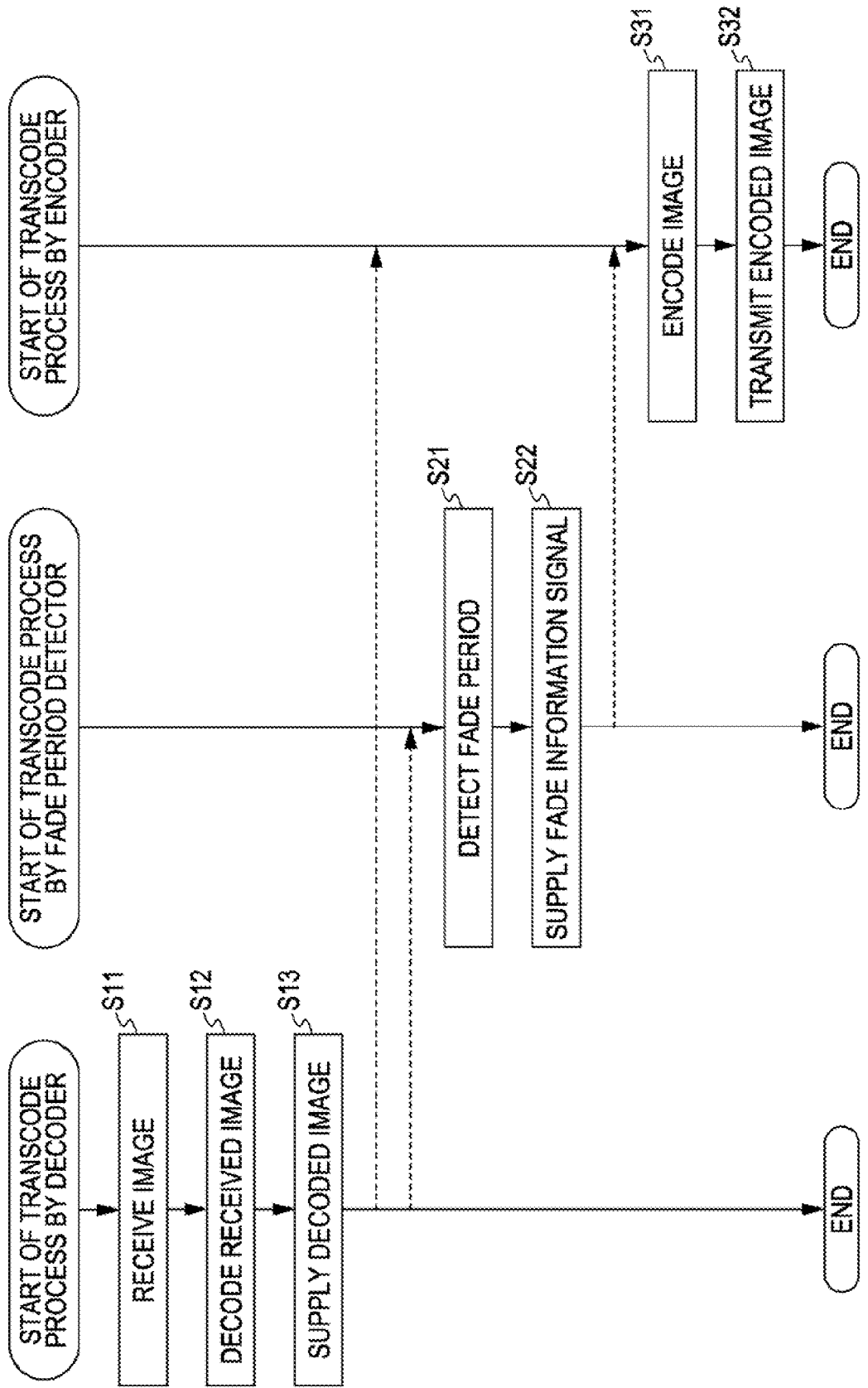
FIG. 5 is a flow chart illustrating a transcoding process.
Figure 7:
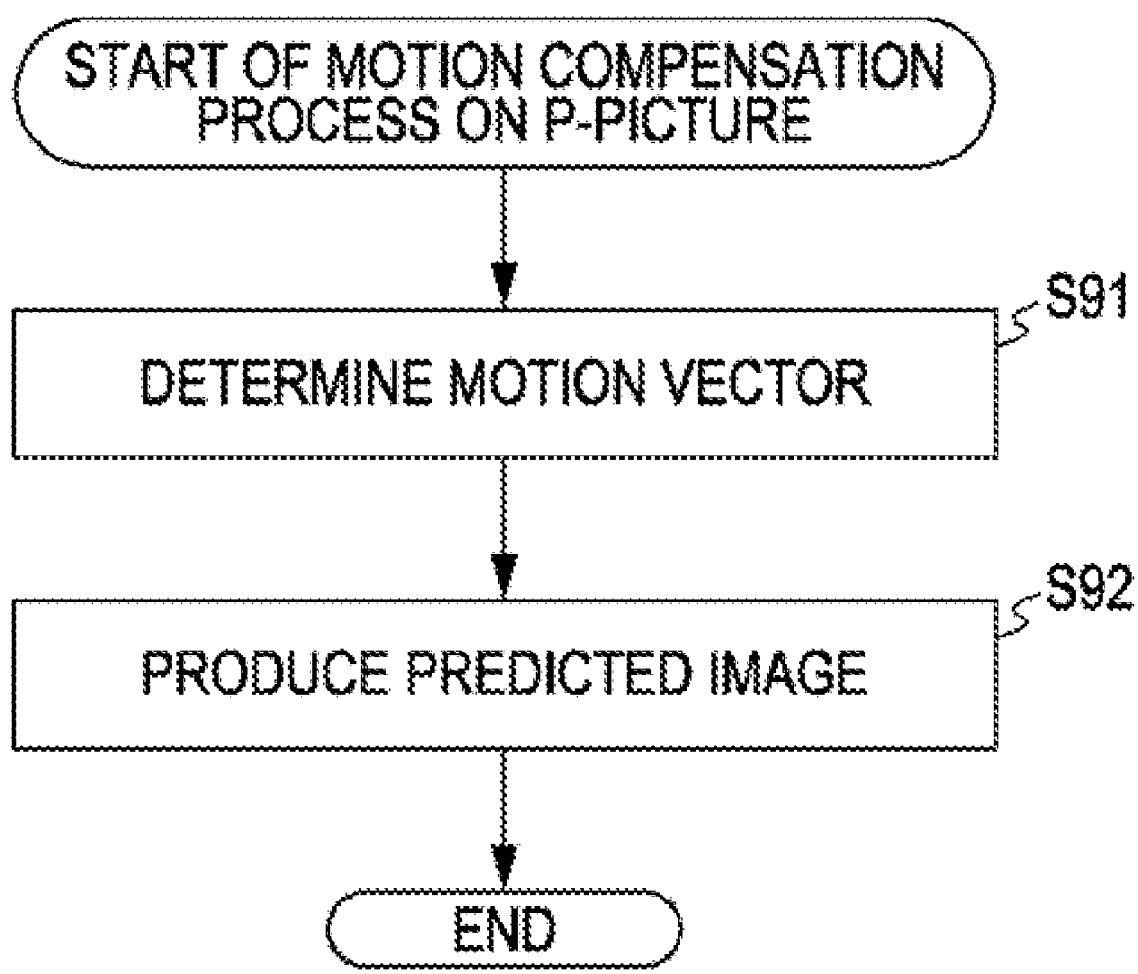
FIG. 7 is a flow chart illustrating a motion compensation process on a P-picture.

If the prediction mode is selected in the above-described manner, then, in step S31 in FIG. 5, the encoder 23 performs a motion compensation process to produce a predicted image associated with the image to be inter-coded. Referring to a flow chart shown in FIG. 7, the motion compensation process performed in encoding a P-picture is described below.

Note that the motion compensation process for P-pictures is performed, for example, in units of macroblocks, and is started when one frame image of a moving image is supplied from the frame rearrangement unit 82 to the motion vector generator 95.

In step S91, the motion vector generator 95 determines a motion vector by a block matching method or the like using the image supplied from the frame rearrangement unit 82 and reference images supplied previously from the frame rearrangement unit 82, in accordance with the prediction mode determined by the motion compensation determination unit 94. The motion vector generator 95 supplies the resultant determined motion vector to the lossless encoder 86 and the motion compensation unit 96.

In step S92, the motion compensation unit 96 performs the motion compensation using the motion vector supplied from the motion vector generator 95 and the reference images stored in the frame memory 93, thereby producing the predicted image. For example, in the case where the weighted prediction mode is determined, as the mode associated with the weighting of prediction, by the motion compensation determination unit 94, the motion compensation unit 96 produces the predicted image by performing the forward prediction in the weighted prediction mode. If the predicted image is produced, the motion compensation unit 96 supplies the produced predicted image to the adder 83. Thus, the motion compensation process is completed.

As described above, the encoder 23 produces the predicted image associated with a P-picture by performing the motion compensation in the above-described manner.

Referring to a flow chart shown in FIG. 8, the motion compensation process performed in encoding a B-picture is described below. Note that the motion compensation process for B-pictures is performed, for example, in units of macroblocks, and is started when one frame image of a moving image is supplied from the frame rearrangement unit 32 to the motion vector generator 95.

In step S121, the acquisition unit 100 a fade information signal from the fade period detector 22.

In step S122, the motion vector generator 95 determines motion vectors by a block matching method or the like using the image supplied from the frame rearrangement unit 32 and reference images supplied previously from the frame rearrangement unit 82. More specifically, the motion vector generator 95 determines a motion vector for use in producing a predicted image by forward prediction, a motion vector for use in producing a predicted image by backward prediction, and motion vectors for use in producing a predicted image by bidirectional prediction.

To determine a motion vector for use in producing a predicted image by forward prediction, the motion vector generator 95 uses, as a reference image, a frame image at a forward location in time, that is, a frame image displayed before a frame image of interest to be encoded. To determine a motion vector for use in producing a predicted image by backward prediction, the motion vector generator 95 uses, as a reference image, a frame image at a backward location in time, that is, a frame image displayed after a frame image of interest to be encoded.

To determine a motion vector for use in producing a predicted image by bidirectional prediction, the motion vector generator 95 uses, as reference images, frame images at forward and backward, locations in time. If the motion vector generator 95 has determined the motion vector, the motion vector generator 95 supplies the produced motion vector to the motion compensation unit 96. When a motion vector for use in producing a predicted image by forward prediction or backward prediction, the reference image is not limited to one image, but a plurality of images may be used.

In step S123, the motion compensation unit 96 produces a predicted image by performing the motion compensation using the motion vector supplied from the motion vector generator 95 and the reference image stored in the frame memory 93, in accordance with the prediction mode determined by the motion compensation determination unit 94. In this process, the motion compensation unit 96 performs the forward prediction, the backward prediction, and the bidirectional prediction and produces predicted images by the respective predictions. The motion compensation unit 96 supplies the resultant produced predicted images to the motion compensation determination unit 94.

If the implicit weighted prediction mode is specified by the prediction mode signal supplied from the motion compensation determination unit 94 to the motion compensation unit 96, the motion compensation unit 96 produces the predicted image by performing the bidirectional weighted prediction in the implicit weighted prediction mode. In this case, when the forward prediction or the backward prediction is performed, the motion compensation unit 96 produces a predicted image without performing weighting in the prediction.

In the case where the explicit weighted prediction mode is specified by the prediction mode signal supplied from the motion compensation determination unit 94 to the motion compensation unit 96, the motion compensation unit 96 produces the predicted image by the forward prediction, the predicted image by the backward prediction, and the predicted image by the bidirectional prediction by performing the bidirectional weighted prediction in the explicit weighted prediction mode.

On the other hand, in the case where the prediction mode signal supplied from the motion compensation determination unit 94 to the motion compensation unit 96 indicates that no weighting is performed, the motion compensation unit 96 produces the predicted image by the forward prediction, the predicted image by the backward prediction, and the predicted image by the bidirectional prediction without performing weighting.

In step S124, the motion compensation determination unit 94 determines the prediction residual indicating the difference between the predicted image and the image to be encoded, from the image supplied from the frame rearrangement unit 82 and the predicted image supplied from the motion compensation unit 96.

More specifically, the motion compensation determination unit 94 determines the prediction residual indicating the difference between the predicted image by the forward prediction and the image to be encoded, the prediction residual indicating the difference between the predicted image by the backward prediction and the image to be encoded, and the prediction residual indicating the difference between the predicted image by the bidirectional prediction and the image to be encoded.

In step S125, the motion compensation determination unit 94 determines, based on the fade information signal acquired by the acquisition unit 100, whether the image to be encoded is in a fade period.

If it is determined in step S125 that the image is not in a fade period, steps S126 and S127 are skipped and the process proceeds to step S128.

On the other hand, in the case where it is determined in step S125 that the image is in a fade period, the process proceeds to step S126. In step S126, the motion compensation determination unit 94 determines the difference between the prediction residual by the forward prediction and the prediction residual by the backward prediction.

In step S127, the motion compensation determination unit 94 determines whether the absolute value of the difference determined in step S126 is equal to or smaller than a predetermined threshold value. If it is determined in step S127 that the absolute value of the difference is neither equal to nor smaller than the predetermined threshold value, the process proceeds to step S128.

If it is determined in step S125 that the image is not in a fade period or it is determined in step S127 that the absolute value of the difference is neither equal to nor smaller than the predetermined threshold value, then, in step S128, the motion compensation determination unit 94 selects a prediction mode which results in the least prediction residual from the forward prediction mode, the backward prediction mode, and she bidirectional prediction mode, and uses the selected prediction mode as the motion compensation mode.

That is, of the three modes, i.e., the forward prediction mode in which prediction is performed in the forward direction, the backward prediction mode in which prediction is performed in the backward direction, and the bidirectional prediction mode in which prediction is performed bidirectionally, the motion compensation determination unit 94 selects a prediction mode which results in the least prediction residual from the forward prediction mode, the backward prediction mode, and the bidirectional prediction mode, and uses the selected prediction mode as the motion compensation mode. The motion compensation determination unit 94 supplies the prediction mode signal indicating the selected motion compensation mode to the lossless encoder 86, the motion vector generator 95, and the motion compensation unit 96.

When the prediction residual indicating the goodness of the prediction by the motion compensation is greatly different depending on which one of the prediction modes, i.e., the forward prediction, the backward prediction, and the bidirectional prediction is used in the motion compensation, the coding efficiency is greatly different depending on which one of the prediction modes is used in the motion compensation. Therefore, to achieve a high coding efficiency, when the difference of the prediction residual is greater than the predetermined threshold value, the motion compensation determination unit 94 selects a prediction mode which results in the least prediction residual from the forward prediction mode, the backward prediction mode, and the bidirectional prediction mode, and produces the predicted image using the selected prediction mode.

In the case where it is determined in step S127 that the absolute value of the difference is equal to or smaller than the predetermined threshold value, the process proceeds to step S123. In step S123, the motion compensation determination unit 94 selects the bidirectional prediction mode as the motion compensation mode, and the motion compensation determination unit 94 supplies the prediction mode signal indicating the selected motion compensation mode to the lossless encoder 86, the motion vector generator 95, and the motion compensation unit 96.

When the prediction residual indicating the goodness of the prediction by the motion compensation is not greatly different regardless of which prediction mode is selected from the forward prediction, the backward prediction, and the bidirectional prediction, a high coding efficiency can be achieved regardless of the prediction mode used in the motion compensation. Therefore, in the encoding of an image in a fade period, if the difference of the prediction residual is equal to or smaller than the predetermined threshold value, the motion compensation determination unit 94 produces the predicted image by the bidirectional prediction in order to minimize degradation in image quality.

In the case where it is determined in step S125 that the image is in a fade period, the bidirectional prediction mode may be selected as the motion compensation mode regardless of the difference of the prediction residual.

If the motion compensation mode is selected in step S128 or S129, then in step S130, the motion vector generator 95 selects a motion vector corresponding to the motion compensation mode notified by the motion compensation determination unit 94 from the motion vectors determined in step S122. The motion vector generator 95 supplies the selected motion vector to the lossless encoder 86.

In step S131, the motion compensation unit 96 selects, from the predicted images produced in step S123, a predicted image corresponding to the motion compensation mode determined by the motion compensation determination unit 94, and the motion compensation unit 96 supplies the selected predicted image to the adder 83. Thus, the motion compensation process is completed.

As described above, the encoder 23 selects the motion compensation mode in the above-described manner in accordance with the fade information signal and the prediction residuals of the respective motion compensation mode.

By selecting an optimum motion compensation mode in accordance with the fade information signal and the prediction residuals of the respective motion compensation mode in the above-described manner, it is possible to perform high-efficiency encoding even on an image in a fade period without creating significant degradation in image quality.

That is, when the image of interest to be encoded is a B-picture, if the image of interest to be encoded is in a fade period, higher priority is given to image quality than to the coding efficiency, and the bidirectional prediction mode is used to achieve high image quality. When the image of interest to be encoded is not in a fade period, highest priority is given to the coding efficiency, and the image prediction is performed in a motion compensation mode which gives the highest coding efficiency. By selecting an optimum motion compensation mode in the above-described manner in accordance with the fade information signal and the prediction residuals of the respective motion compensation modes, it is possible to encode the image so as to achieve highest image quality regardless of whether the image is in a fade period.

In the embodiment described above, the mode of the motion compensation process in the image encoding process performed by the encoder 23 is changed in accordance with the fade information signal. Alternatively, the GOP structure may be changed in accordance with the fade information signal.

Figure 9:
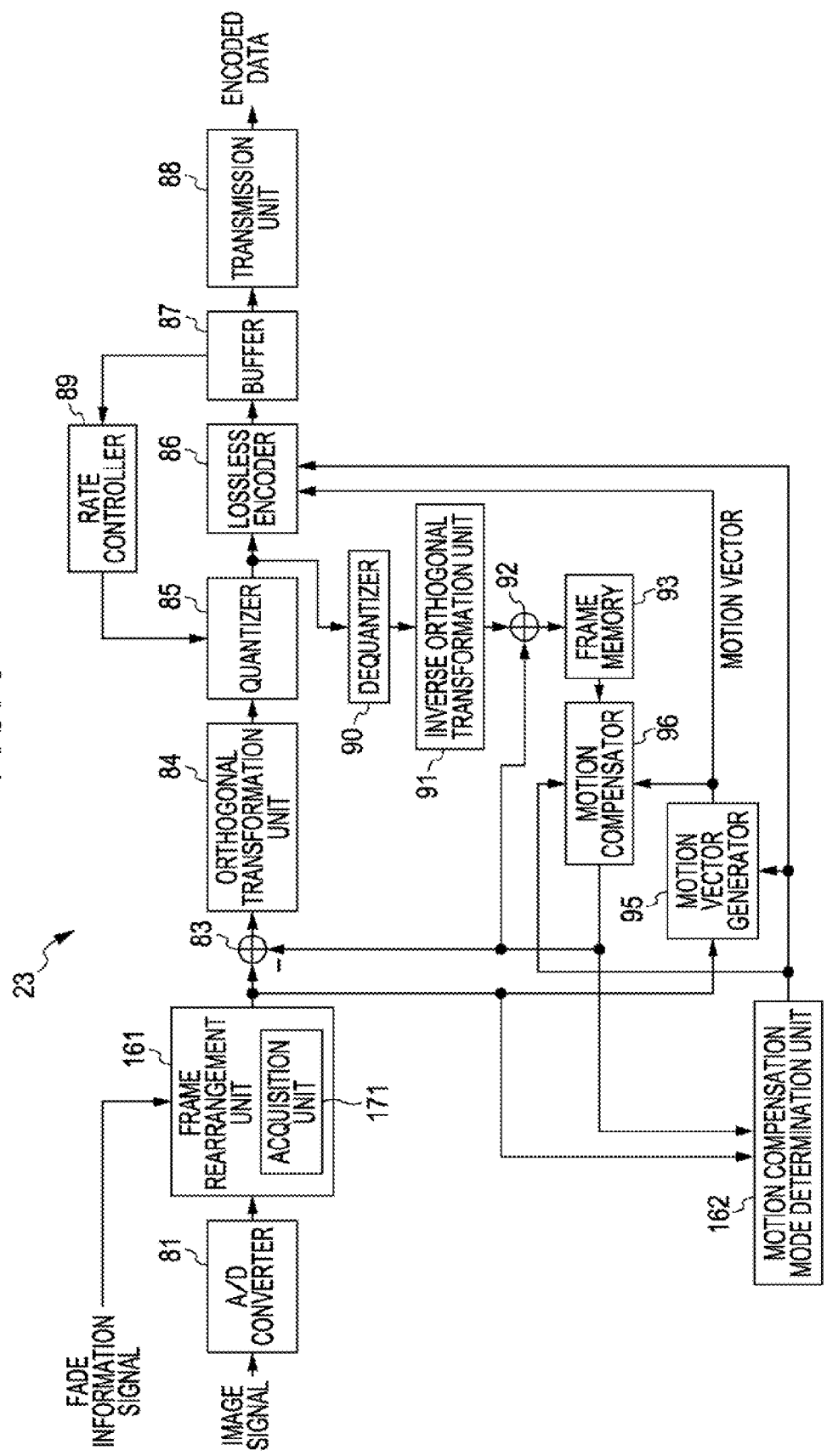
FIG. 9 is a block diagram illustrating an example of a configuration of an encoder according to an embodiment of the present invention.

In this case, the encoder 23 may be configured, for example, as shown in FIG. 9. In FIG. 9, similar parts to those in FIG. 3 are denoted by similar reference numerals, and a duplicated explanation thereof is omitted herein.

In the configuration of the encoder 23 shown in FIG. 9, a frame rearrangement unit 161 includes an acquisition unit 171 adapted to acquire a fade information signal from a fade period detector 22. The frame rearrangement unit 161 changes the GOP structure in accordance with the acquired fade information signal. The frame rearrangement unit 161 rearranges frames of the image supplied from the A/D converter 81 in accordance with the GOP structure, and supplies the resultant image to the adder 83, the motion compensation determination unit 162, and the motion vector generator 95.

In the case where the image of interest is to be inter-coded, the motion compensation determination unit 162 selects a motion compensation mode which gives a highest coding efficiency, based on the image supplied from the frame rearrangement unit 161 and the predicted image supplied from the motion compensation unit 96. The motion compensation determination unit 162 supplies a mode signal indicating the selected motion compensation mode to the lossless encoder 86, the motion vector generator 95, and the motion compensation unit 96.

Figure 10:
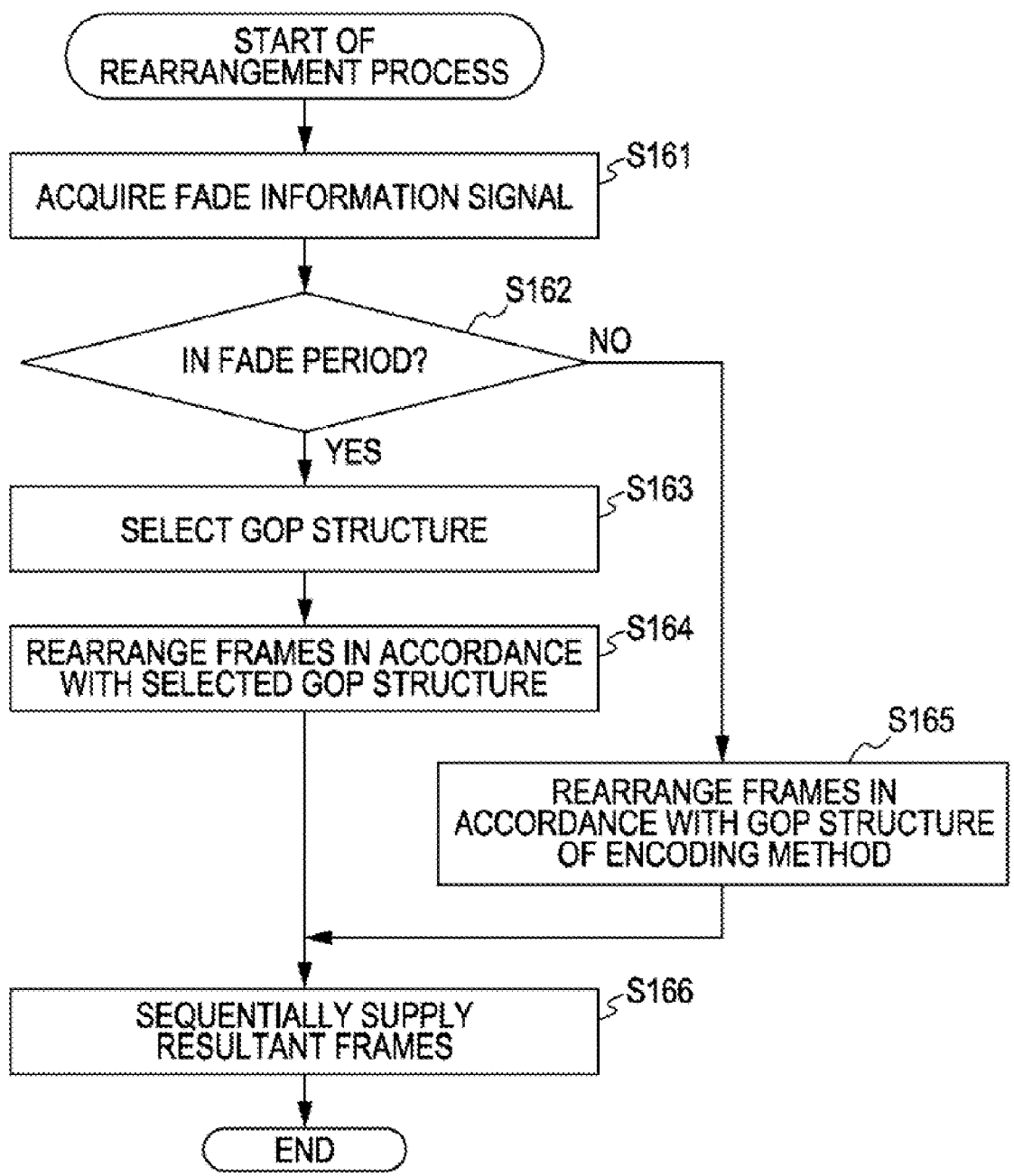
FIG. 10 is a flow chart illustrating a rearrangement process.

Referring to a flow chart shown in FIG. 10, the rearrangement process performed in step S31 in FIG. 5 by the frame rearrangement unit 161 when the image is encoded is described below. The rearrangement process is performed, for example, in units of GOPs, and is started when an image in a GOP structure is supplied from the A/D converter 81 to the frame rearrangement unit 161.

In step S161, the acquisition unit 171 acquires a fade information signal from the fade period detector 22.

In step S162, based on the acquired fade information signal, the frame rearrangement unit 161 determines whether the image is in a fade period. More specifically, for example, when the frame rearrangement unit 161 receives frame images in a GOP of a moving image to be encoded from the A/D converter 81, if all frame images in this GOP are included in a fade period, the frame rearrangement unit 161 determines that a fade period is detected.

If it is determined in step S162 that the image is in a fade period, the process proceeds to step S163. In step S163, in accordance with various parameters associated with the encoding method used, to encode the moving image, the frame rearrangement unit 161 selects a GOP structure optimum for achieving high efficiency in encoding of an image in a fade period according to the specified encoding method.

For example, in the case where the moving image is encoded by the MPEG-2 method, the frame rearrangement unit 161 selects a GOP structure including only one or more P-pictures and one or more I-pictures. In the MPEG-2 method, high coding efficiency is generally achieved for a GOP structure including two B-pictures between adjacent P-pictures. However, in a fade period, it is difficult to achieve high accuracy in prediction by motion compensation. Therefore, the frame rearrangement unit 161 selects a GOP structure including only P-pictures and I-pictures and including no B-pictures to achieve high efficiency in encoding without having significant degradation in image quality.

On the other hand, in a case where a moving image is encoded by a JVT method, the frame rearrangement unit 161 selects a GOP structure so as to include only P-pictures and I-pictures or include two B-pictures between adjacent P-pictures.

Because the encoder 23 selects a GOP structure so as to include only P-pictures and I-pictures as with the MPEG-2 method, it is possible to achieve high efficiency in encoding without having significant degradation in image quality. In the JVT method, in general, high efficiency is achieved in encoding when the GOP structure includes one B-picture between adjacent P-pictures. However, in a fade period, in order to take advantage of the implicit weighted prediction mode, the encoder 23 increases the number of B-pictures of the GOP structure of the image such that each GOP structure includes two B-pictures between adjacent P-pictures, whereby high efficiency is achieved in encoding without having degradation in image quality.

In step S164, the frame rearrangement unit 161 rearranges the frame images supplied from the A/D converter 81 in accordance with the selected GOP structure. The process then proceeds to step S166.

On the other hand, in the case where it is determined in step S162 that the image is not in a fade period, the process proceeds to step S165. In step S165, the frame rearrangement unit 161 rearranges the image supplied from the A/D converter 81 in accordance with the GOP structure of the encoding method used to encode the moving image. The process then proceeds to step S166.

As described above, each encoding method has its own predefined GOP structure. For example, in the MPEG-2 method, the GOP structure is defined to include two B-pictures between adjacent P-pictures. In the case of the JVT method, the GOP structure is defined to include one B-picture between adjacent P-pictures. Thus, the frame rearrangement unit 161 rearranges frame images in accordance with the GOP structure defined for the encoding method used to encode the moving image.

In step S166, the frame rearrangement unit 161 supplies the rearranged frame images on a frame-by-frame to the adder 83. Thus, the rearrangement process is completed.

As described above, the frame rearrangement unit 161 changes the GOP structure of the image to be encoded, depending on whether the image is in a fade period.

That is, the GOP structure of the image to be encoded is changes depending on whether the image is in a fade period such that when the image is in a fade period, a GOP structure is selected which allows it to achieve highest efficiency in encoding of the image in the fade period without producing degradation in image quality, while when the image is not in a fade period but in a normal period, a GOP structure is selected which allows it to achieve highest efficiency in encoding of the image in the normal period without producing degradation in image quality.

In an alternative embodiment, as described below, the encoder 23 may change the bit rate, i.e., the amount of code per unit time assigned to the moving image, in accordance with the fade information signal.

Figure 11:
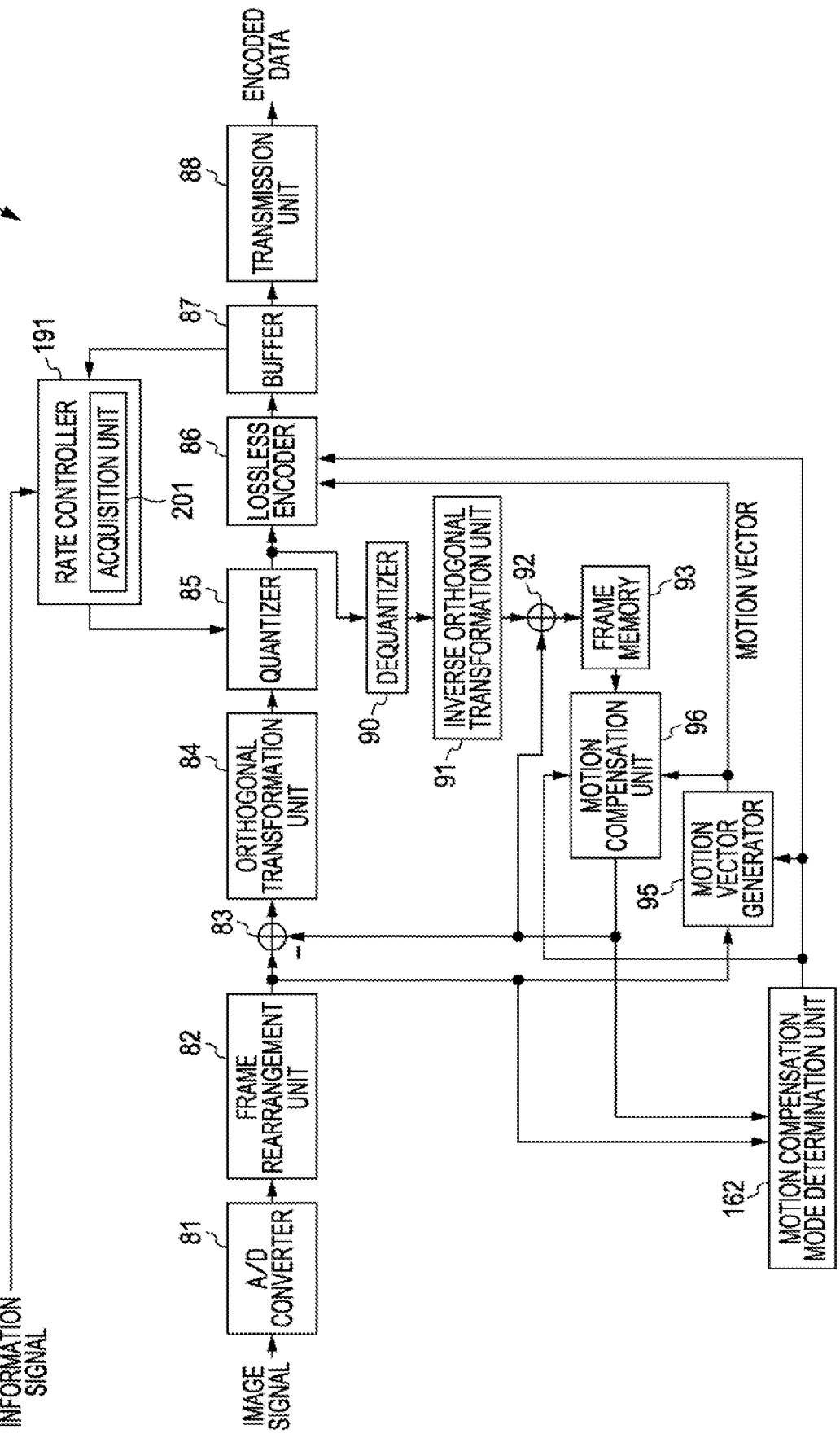
FIG. 11 is a block diagram illustrating an example of a configuration of an encoder according to an embodiment of the present invention.

In this case, the encoder 23 may be configured, for example, as shown in FIG. 11. In FIG. 11, similar parts to those in FIG. 3 or 9 are denoted by similar reference numerals, and a duplicated explanation thereof is omitted herein.

In the encoder 23 shown in FIG. 11, the rate controller 191 includes an acquisition unit 201 adapted to acquire a fade information signal from the fade period detector 22. The rate controller 191 changes the bit rate assigned to the moving image in accordance with the fade information signal. In accordance with the changed bit rate, the rate controller 191 calculates the quantization value used by the quantizer 85 to quantize transform coefficients, and supplies the calculated quantization value to the quantizer 85.

Referring to a flow chart shown in FIG. 12, a bit rate control process performed in step S31 in FIG. 5 by the rate controller 191 to control the bit rate in the encoding of the image is described below. The bit rate control process is performed, for example, in units of frames, and is started each time one frame of encoded image is newly stored in the buffer 87.

In step S191, the rate controller 191 accesses the buffer 67 to acquire the amount of code of one frame of image newly stored in the buffer 87.

In step S192, the rate controller 191 updates the total amount of code, i.e., the sum of amounts of code of frame images which are included in the frame images of the moving image being subjected to encoding and which have already been encoded. More specifically, the rate controller 191 has data indicating the total amount of code generated as a result of encoding of the moving image and updates the data by adding the amount of code of a newly encoded frame image to the present total amount of code.

In step S193, the acquisition unit 201 acquires the fade information signal from the fade period detector 22.

In step S194, the rate controller 191 determines, based on the acquired fade information signal, whether the image to be encoded is in a fade period.

On the other hand, in the case where it is determined in step S194 that the image is in a fade period, the process proceeds to step S195. In step S195, the rate controller 191 changes the bit rate of the moving image so as to be greater by a predetermined value than a predetermined bit rate value. The process then proceeds to step S193. That is, the rate controller 191 increases the amount of code assigned to the frame image to be encoded.

On the other hand, in the case where it is determined in step S194 that the image is not in a fade period, the process proceeds to step S196. In step S196, the rate controller 191 determines whether the current total amount of code is greater than the predetermined target value of the total amount of code.

In a case where it is determined in step S196 that the current total amount of code is not greater than the target value, it is determined that the moving image is being encoded at the bit rate equal to the target value, and thus the process proceeds to step S198 without performing changing of the bit rate of the moving image by the rate controller 191.

In a case where it is determined in step S196 that the current total amount of code is greater than the target value, the process proceeds to step S197. In step S197, the rate controller 191 changes the bit rate of the moving image so as to be smaller by a predetermined value than the predetermined bit rate value. The process then proceeds to step S198. That is, the rate controller 191 decreases the amount of code assigned to the frame image to be encoded.

If the bit rate is changed in step S195 or S197 or if it is determined in step S196 that the current total amount of code is not greater than the target value, then, in step S198, the rate controller 191 calculates the quantization value in accordance with the bit rate of the moving image. The rate controller 191 supplies the calculated quantization value to the quantizer 85. Thus, the bit rate control process is completed.

As described above, the rate controller 191 controls the bit rate assigned to the moving image in accordance with the fade information signal and the total amount of code.

For an image in a fade period, the motion compensation does not give a good prediction, and thus if quantization is performed using the same quantization value as that used for images in a normal period, the result is an increase in the total amount of code for images in a fade period compared with images in the normal period. Therefore, if the bit rate is controlled taking into account only the total amount of code to maintain the bit rate of the moving image at a constant value, it becomes necessary to increase the quantization value for images in a fade period to prevent the amount of code from becoming large. The result is an increase in a quantization error, which results in an increase degradation in image quality.

The above problem can be avoided by allowing a certain increase in the amount of code of images in a fade period and setting the bit rate of the moving image to be greater than at predetermined value whereby the increase in quantization value is minimized and thus degradation in image quality is minimized. If the bit rate is increased in a fade period, the result is an increase in the total amount of code of the moving image. This increase in the amount of code in the fade period is adjusted in a normal period.

More specifically, in a normal period after the fade period, the bit rate of the moving image is set to be lower than a predetermined value such that the total amount of code of the moving image becomes equal to the predetermined target value.

If the bit rate is changed depending on whether the image is in a fade period, it is necessary to reduce the bit rate in a certain period after the fade period to prevent an increase in the total amount of code as described above, degradation in image quality occurs in the certain period after the fade period. However, in general image sequences, the total length of fade periods included in a moving image is extremely small relative to the total length of normal periods (non-fade periods). Therefore, the length of the period in which the bit rate is reduced after the fade period can be set to be several times greater than the length of the fade period.

This means that it is allowed to reduce the bit rate by a very small amount in the period after the fade period compared with the increase in the bit rate in the fade period. That is, in practice, a great reduction in the bit rate is not necessary in the period after the fade period, and thus substantially no degradation in image quality occurs in the encoding of the moving image.

By controlling the bit rate of the moving image in accordance with the fade information signal and the total amount of code in the above-described manner, it is possible to perform high-efficiency encoding even on an image in a fade period without creating significant degradation in image quality.

In an alternate embodiment, encoder 23 may change a weighting factor matrix used in quantization of transform coefficients in accordance with the fade information signal.

Figure 13:
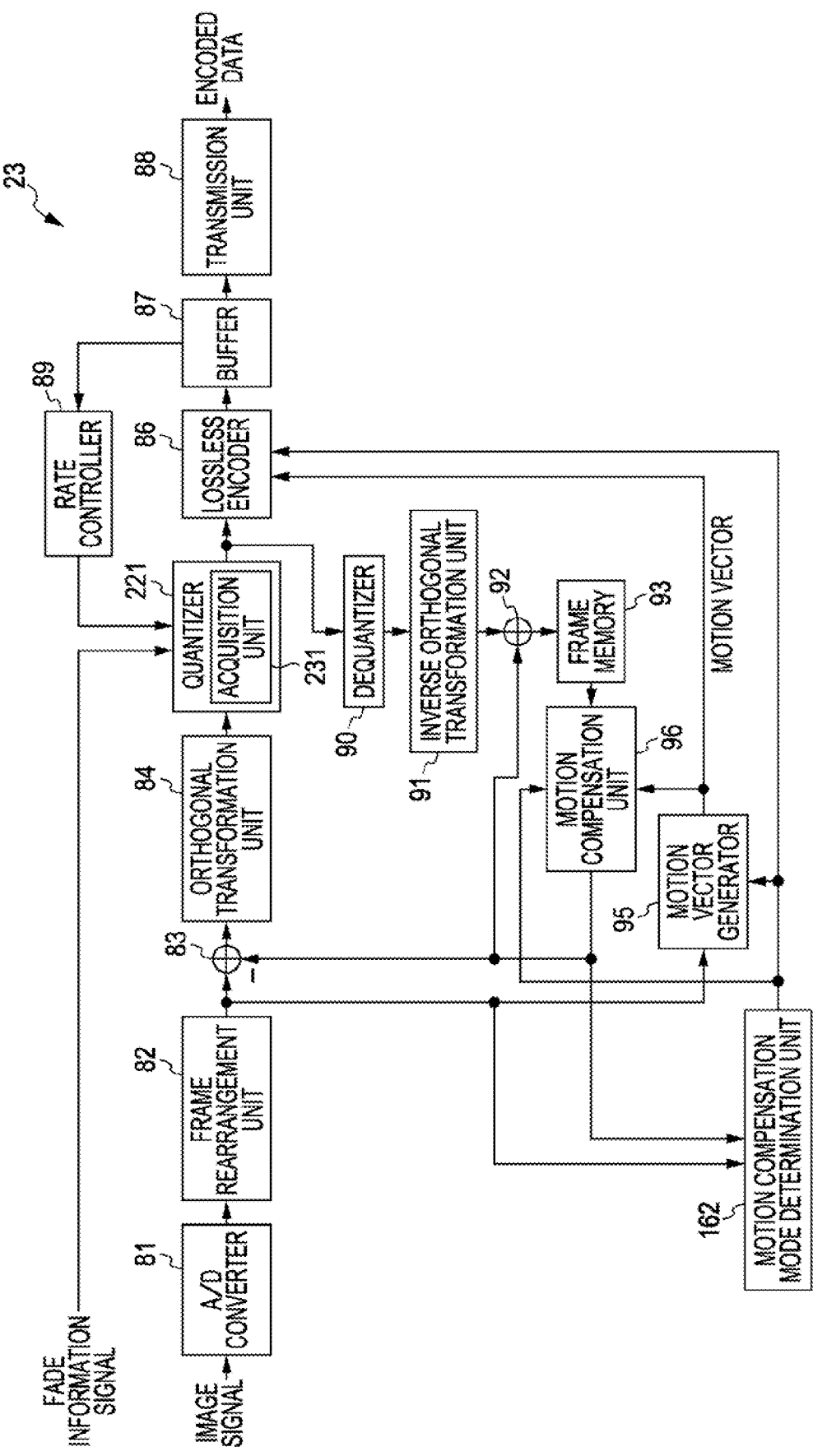
FIG. 13 is a block diagram illustrating an example of a configuration of an encoder according to an embodiment of the present invention.

In this case, the encoder 23 may be configured, for example, as shown in FIG. 13. In FIG. 13, similar parts to those in FIG. 3 or 9 are denoted by similar reference numerals, and a duplicated explanation thereof is omitted herein.

In the encoder 23 shown in FIG. 13, the quantizer 221 includes an acquisition unit 231 adapted to acquire a fade information signal from the fade period detector 22. The quantizer 221 selects a weighting factor matrix in accordance with the acquired fade information signal. The quantizer 221 may switch the weighting factor matrix in predetermined units such as frames or pictures.

The quantizer 221 quantizes transform coefficients by using the selected weighting factor matrix and the quantization value supplied from the rate controller 89. The quantized transform coefficients are supplied to the lossless encoder 86 and the dequantizer 90.

Figure 14:
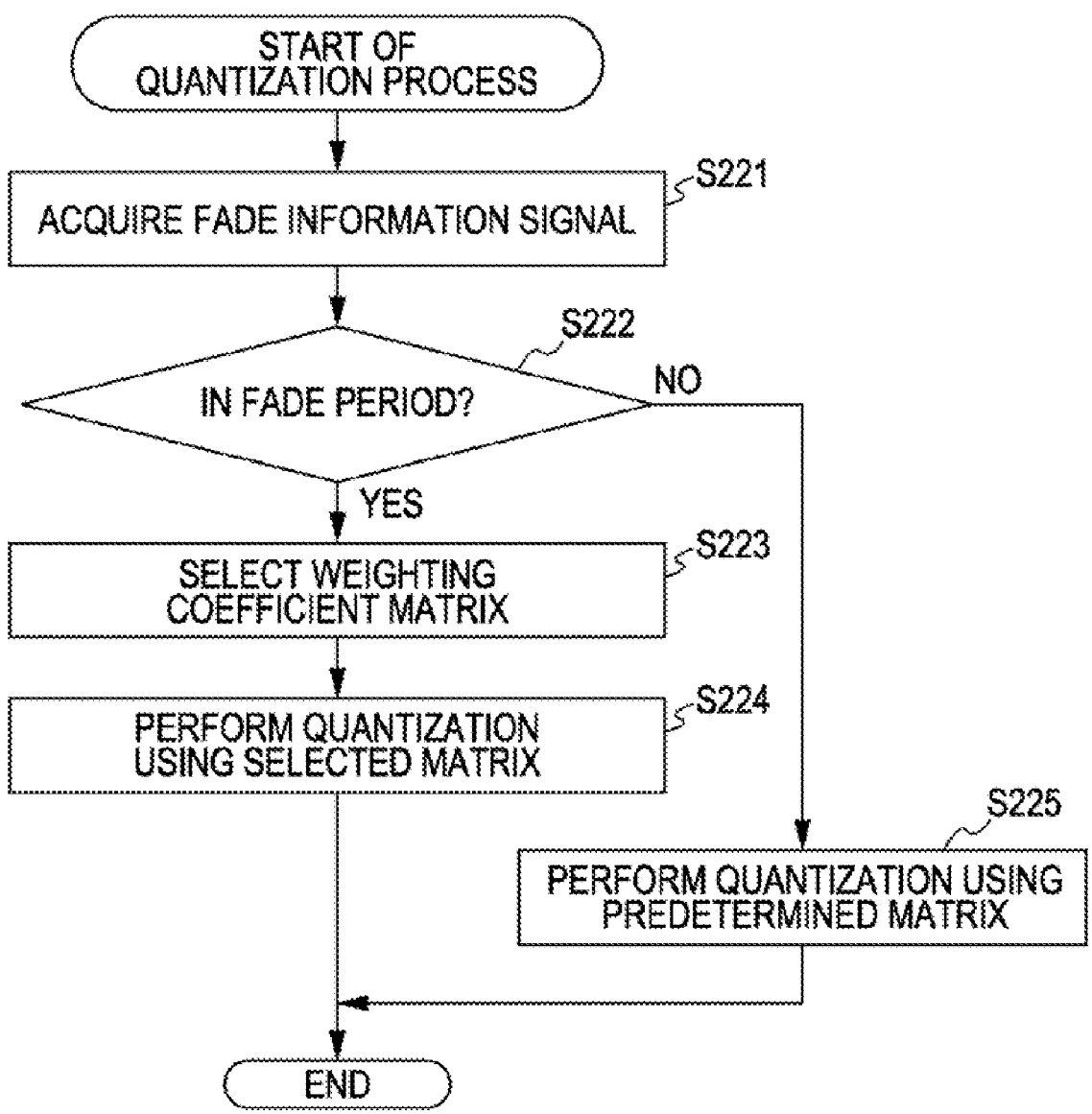
FIG. 14 is a flow chart illustrating a quantization process.

Referring to a flow chart shown in FIG. 14, the quantization process performed in step S31 in FIG. 5 by the quantizer 221 to quantize transform coefficients in encoding of an image is described below. The quantization process is performed, for example, in units of frames, and is started when transform coefficients are supplied from the orthogonal transformation unit 64.

In step S221, the acquisition unit 231 acquires a fade information signal from the fade period detector 22.

In step S222, the quantizer 221 determines, on the basis of the acquired fade information signal, whether the transform coefficients to foe quantized are of an image in a fade period.

In a case where it is determined in step S222 that the transform coefficients are of an image in a fade period, the process proceeds to step S223. In step S223, the quantizer 221 selects a weighting factor matrix optimum for quantization of the transform coefficients of the image in the fade period.

In a fade period, global brightness of a frame image gradually changes. Therefore, better subjective image quality is obtained by precisely representing a global characteristic such as global brightness than by precisely representing each local part. That is, in a fade period, low-frequency components are more important and high-frequency components are less important than in a normal period. Therefore, it is desirable to optimize a weighting factor matrix such that in the fade period, the quantization values for low-frequency components are smaller than those in a usual weighting factor matrix, while quantization values for high-frequency components are greater whereby higher priority is given to accuracy of low-frequency components.

In view of the above, the quantizer 221 selects a weighting factor matrix including weighting factors greater than predetermined weighting factors for transform coefficients associated with frequencies higher than a predetermined frequency but smaller than the predetermined weighting factors for transform coefficients associated with frequencies lower than the predetermined frequency. That is, the quantizer 221 selects a weighting factor matrix whose elements are set such that greater weighting factors are assigned to transform coefficients at higher frequencies while smaller weighting factors are assigned to transform coefficients at lower frequencies.

The predetermined weighting factors refer to weighting factors expressed in the form of a matrix (also called a scaling list) by which to weight the quantization value in quantization of transform coefficients at respective frequencies in a normal period other than fade periods.

The quantizer 221 may select a weighting factor matrix including weighting factors greater than predetermined weighting factors for transform coefficients associated with frequencies higher than a predetermined frequency but equal to the predetermined weighting factors for transform coefficients associated with frequencies lower than the predetermined frequency or may select a weighting factor matrix including weighting factors equal to predetermined weighting factors for transform coefficients associated with frequencies higher than a predetermined frequency but smaller than the predetermined weighting factors for transform coefficients associated with frequencies lower than the predetermined frequency.

As described above, when transform coefficients of an image in a fade period are quantized, the quantizer 221 selects a weighting factor matrix including weighting factors graded more greatly than weighting factors used in quantization of transform coefficients of an image in a normal period other than fade periods.

In step S224, the quantizer 221 quantizes transform coefficients using the selected matrix and the quantization value supplied from the rate controller 89. More specifically, for example, the quantizer 221 multiplies the quantization value by weighting factors given by the matrix thereby obtaining a weighted quantization value. The quantizer 221 then divides the transform coefficients by the weighted quantization value to obtain quantized transform coefficients. The quantized transform coefficients are supplied from the quantizer 221 to the lossless encoder 86 and the dequantizer 90. Thus, the quantization process is completed.

Note that the selected weighting factor matrix is also supplied from the quantizer 221 to the lossless encoder 86. If the lossless encoder 86 receives the weighting factor matrix, the lossless encoder 86 performs lossless encoding such as variable-length encoding or arithmetic encoding on the weighting factor matrix, and the inserts the resultant encoded weighting factor matrix in the image header.

On the other hand, in a case where it is determined in step S222 that the transform coefficients are not of those associated with an image in a fade period, the process proceeds to step S225. In step S225, the quantizer 221 quantizes the transform coefficients using a predetermined weighting factor matrix (also called a scaling list) and the quantization value supplied from the rate controller 89. The resultant quantized transform coefficients are supplied from the quantizer 221 to the lossless encoder 86 and the dequantizer 90. Thus, the quantization process is completed.

The values of the elements of the weighting factor matrix are graded such that small quantization values are used for low-frequency components, i.e., for transform coefficients at low frequencies which are easily perceptible to human eyes while large quantization values are used for high-frequency components, i.e., for transform coefficients at high frequencies which are not easily perceptible to human eyes. Note that as in the step S224 described above, the weighting factor matrix is also supplied from the quantizer 221 to the lossless encoder 86.

Thus, the quantizer 221 selects the weighting factor matrix in accordance with the fade information signal in the above-described manner, and quantizes the transform coefficients using the selected weighting factor matrix.

Because the weighting factor matrix is selected in accordance with the fade information signal, and the transform coefficients are quantized using the selected weighting factor matrix in the above-described manner, the quantization is performed using the weighting factor matrix optimized for the fade period, and thus high encoding efficiency is achieved for images in the fade period without producing significant degradation in image quality.

In the embodiment described above, the fade period detector 22 in the encoded data converter 12 detects fade periods in a moving image. Alternatively, the decoder 21 may detect fade periods in a moving image. For this purpose, the decoder 21 may be configured, for example, as shown in FIG. 15. Note that in FIG. 15, similar parts to those in FIG. 2 are denoted by similar reference numerals, and a duplicated explanation thereof is omitted herein.

In the configuration shown in FIG. 15, the decoder 21 additionally includes a fade period detector 261. The other parts denoted by reference numerals from 51 to 60, i.e., from the receiving unit 51 to the motion compensation unit 60 are similar to those shown in FIG. 3. The fade period detector 261 detects a fade period from an image supplied from the frame rearrangement unit 57 and produces a fade information signal indicating a detection result. The resultant fade information signal is supplied from the fade period detector 261 to the encoder 23.

Referring to a flow chart shown in FIG. 16, the transcoding process performed by the decoder 21 in the fade period detection process is described below.

Note that steps S281 to S253 are similar to steps S11 to S13 shown in FIG. 5, and thus a duplicated explanation thereof is omitted herein. When the image is decoded by the decoder 21 in step S252, the frame rearrangement unit 57 supplies the rearranged image to the D/A converter 58 and the fade period detector 261.

In step S254, the fade period detector 261 detects a fade period on the basis of the image supplied from the frame rearrangement unit 57. More specifically, for example, the fade period detector 261 determines the luminance of each frame image of the moving image, and detects a fade period on the basis of a change in the luminance of the successive frame images.

More specifically, the fade period detector 261 determines the luminance of each frame image by calculating the average of luminance values of respective pixel values of the frame image. The fade period detector 261 then calculates the difference of the determined luminance of the frame image of interest and the average of luminance values of three successive frame images immediately previous to the frame image of interest. If the difference is equal to or greater than a predetermined threshold value, then the fade period detector 261 determines that the frame image of interest is in a fade period.

In step S255, the fade period detector 261 produces a fade information signal indicating the result of the determination in terms of the fade period and supplies the produced fade information signal to the encoder 23. Thus, the transcoding process is completed. Thereafter, steps S261 and S262 are performed in the encoder 23. These steps are similar to steps S31 and 332 shown in FIG. 5, and thus a duplicated explanation thereof is omitted.

In step S261, encoding of the image is performed. The encoding process in step S261 includes a prediction mode selection process, a motion compensation process, a rearrangement process, a bit rate control process, and a quantization process, which are similar to those described above.

If the decoder 21 decodes the image and detects a fade period of the image in the above-described manner, the decoder 21 supplies a signal indicating the detection result to the encoder 23. The encoder 23 decodes the encoded image and supplies resultant decoded image to the decoder 13.

If a fade period is detected in the image, a fade information signal indicating the detection result is supplied to the encoder 23 so that the encoder 23 can encode the image in a highly efficient manner in accordance with the supplied fade information signal without producing significant degradation in image quality.

In the above-described embodiment, the decoder 21 detects a fade period on the basis of the decoded image. Alternatively, a fade period may be detected on the basis of the encoded image which has not yet been decoded. In this case, the decoder 21 may be configured, for example, as shown in FIG. 17.

In FIG. 17, similar parts to those in FIG. 15 are denoted by similar reference numerals, and a duplicated explanation thereof is omitted herein. In the configuration of the decoder 21 shown in FIG. 17, the fade period detector 261 is connected to the buffer 52, and the fade period detector 261 detects a fade period on the basis of an encoded image supplied to the buffer 52.

More specifically, for example, the fade period detector 261 detects a fade period on the basis of information described in the image header in terms of the number of intra-coded B-pictures and P-pictures of the total. B-pictures and P-pictures of frame images of the moving image.

That is, the fade period detector 261 analyses information described in the image header to detect the encoding method of the frame images, that is, to detect whether the image is encoded by intra-coding, the forward prediction, the backward prediction, the bidirectional prediction, or direct mode, the fade period detector 261 counts the number of intra-coded B-pictures and P-pictures. The counted number are stored in the fade period detector 261. If the number of intra-coded B-pictures and P-pictures included in frame images in a period with a predetermined length is greater than a predetermined threshold value, then the fade period detector 261 determines that this period is a fade period.

If the fade period detector 261 detects a fade period, the fade period detector 261 generates a fade information signal indicating a detection result, and supplies it to the encoder 23. In the image processing system shown in FIG. 1, the decoder 21 may supply an encoded image to the fade period detector 22, and the fade period detector 22 may detect a fade period on the basis of the number of intra-coded B-picture and P-picture of the image received from the decoder 21.

The encoder 23 adapted to select an optimum process in encoding of an image in accordance with the fade information signal may be applied not only to the image processing system shown in FIG. 1 but also to a wide variety of image processing systems such as that shown in FIG. 18. In FIG. 18, similar parts to those in FIG. 1 are denoted by similar reference numerals, and a duplicated explanation thereof is omitted herein.

In the example shown in FIG. 18, the image processing system includes a fade period detector 22, an encoder 23, and a decoder 13. The encoder 23 and the decoder 13 are connected to each other via a communication network 15.

An image to be encoded is supplied in the form of a baseband signal from an apparatus (not shown) to the fade period detector 22 and the encoder 23. The fade period detector 22 detects a fade period from the supplied image and supplies a fade information signal indicating the defection result to the encoder 23.

The encoder 23 encodes the image supplied from the apparatus in accordance with the fade information signal supplied from the fade period detector 22. More specifically, for example, the encoder 23 selects an optimum process performed in the encoding of the image in accordance with the fade information signal, and encodes the image by performing the selected process.

After the encoder 23 encodes the image, the encoder 23 modulates the encoded image and transmits the modulated image to the decoder 13 via the communication network 15. If the decoder 13 receives the image transmitted from the encoder 23, the decoder 13 demodulates the received image. The decoder 13 then decodes the demodulated image by a decoding method corresponding to the encoding method used by the encoder 23. The resultant image is displayed or used in various manners.

By selecting an optimum process in the encoding of an image depending on whether the image is in a fade period in the above-described manner, high coding efficiency can be achieved without producing significant degradation in image quality.

Furthermore, in accordance with the fade information signal indicating the detection result of the fade period, it is possible to encode the image with high efficiency without producing significant degradation in image quality.

The sequence of processing steps described above may be performed by means of hardware or software. When the processing sequence is executed by software, a program forming the software may be installed from a program storage medium onto a computer which is provided as dedicated hardware or may be installed onto a general-purpose computer capable of performing various processes in accordance with various programs installed thereon.

FIG. 19 is a block diagram illustrating an example of a personal computer configured to execute a program to perform the sequence of processing steps described above. A CPU (Central Processing Unit) 311 of the personal computer 301 performs various processes in accordance with programs stored in a ROM (Read Only Memory) 312 or a storage unit 313. Programs executed by the CPU 311 and associated data are stored, as required, in a RAM (Random Access Memory) 313. The CPU 311, the ROM 312, and the RAM 313 are connected to each other via a bus 314.

The CPU 311 is also connected to an input/output interface 315 via a bus 314. The input/output interface 315 is connected to an input unit 316 including a keyboard, a mouse, and a microphone and an output unit 317 including a display and a speaker. The CPU 311 performs various processes in accordance with a command input via an input unit 316. The result is output from the CPU 311 to an output unit 317.

The input/output interface 315 is also connected to a storage unit 313 such as a hard disk drive for storing programs executed by the CPU 311 and various kinds of data. A communication unit 319 is for communicating with an external apparatus via a network such as the Internet or a local area network.

A program may be acquired via the communication unit 319 and the acquired program may be stored in the storage unit 318.

When a removable medium 331 such as a magnetic disk, an optical disk, a magneto-optical disk, or a semiconductor memory is mounted on a drive 320 connected to the input/output interface 315, a program and/or data are read from the removable medium 331 mounted on the drive 320. The read program and/or data is transferred to the storage unit 318 and stored therein, as required.

As for the program storage medium on which to store programs to be installed in a computer and executed on the computer, various kinds of storage media are available. In the example of the personal computer shown in FIG. 19, programs may be stored in the removable medium 331 (in the form of a package medium) such as a magnetic disk (such as a flexible disk), an optical disk (such as a CD-ROM (Compact Disc-Read Only Memory) or a DVD (Digital Versatile Disc)), a magneto-optical disk, or a semiconductor memory. Programs may also be stored permanently or temporarily in the ROM 312 or in the storage unit 318 such as a hard disk drive. The program may be stored in the program storage medium via a wire communication medium such as a local area network or the Internet or via a wireless communication medium such as digital broadcasting, using the communication unit 319 serving as an interface such as a router or a modem.

In the present description, the steps described in the program stored in the program storage medium may be performed either in time sequence in accordance with the order described in the program or in a parallel or separate fashion.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing system including a decoder configured to decode an encoded image and an encoder configured to encode the image decoded by the decoder, the decoder including
  decoding means for decoding the encoded image, and
  detection means for detecting, on the basis of the image, a fade period included in the image and supplying a fade information signal indicating a detection result to the encoder,
the encoder including
  acquisition means for acquiring the fade information signal,
  changing means for changing a process performed in the encoding of the image in accordance with the fade information signal, and
  generation means for generating a forward-predicted image by performing motion compensation in a forward prediction mode and generating a backward-predicted image by performing motion compensation in a backward prediction mode,
  wherein the changing means changes the process performed in the motion compensation such that if the current image to be encoded is in a fade period, the changing means changes the process performed on the image in the motion compensation,
  wherein the changing means changes the process performed in the motion compensation such that when a B-picture in a fade period is given as the current image, if the difference between a prediction residual given by the difference between the forward-predicted image and the current image and a prediction residual given by the difference between the backward-predicted image and the current image is less than a predetermined threshold value, the changing means changes the motion compensation mode of the motion compensation into a bidirectional prediction mode.

2. The image processing system according to claim 1, wherein the detection means detects the fade period on the basis of the number of intra-coded P-pictures and B-pictures in the given encoded image.

3. The image processing system according to claim 1, wherein the detection means detects the fade period on the basis of a change in luminance of successive image frames of the image.

4. An image processing method for an image processing system including a decoder configured to decode an encoded image and an encoder configured to encode the image decoded by the decoder, the method comprising the steps of,
in the decoder,
  decoding the encoded image, and
  detecting, on the basis of the image, a fade period included in the image and supplying a fade information signal indicating a detection result to the encoder,
in the encoder,
  acquiring the fade information signal,
  changing a process performed in the encoding of the image in accordance with the fade information signal, and
  generating a forward-predicted image by performing motion compensation in a forward prediction mode and generating a backward-predicted image by performing motion compensation in a backward prediction mode,
  wherein the changing step includes changing the process performed in the motion compensation such that if the current image to be encoded is in a fade period, changing the process performed on the image in the motion compensation, wherein the changing step further includes changing the process performed in the motion compensation such that when a B-picture in a fade period is given as the current image, if the difference between a prediction residual given by the difference between the forward-predicted image and the current image and a prediction residual given by the difference between the backward-predicted image and the current image is less than a predetermined threshold value, changing the motion compensation mode of the motion compensation into a bidirectional prediction mode.

5. A decoder comprising:
decoding means for decoding an encoded image; and
detection means for detecting, on the basis of the image, a fade period included in the image and supplying a fade information signal indicating a detection result to an encoder configured to encode the decoded image such that a process performed in encoding of the decoded image is changed in accordance with the fade information signal,
wherein the encoder includes
    acquisition means for acquiring the fade information signal,
    changing means for changing a process performed in the encoding of the image in accordance with the fade information signal, and
    generation means for generating a forward-predicted image by performing motion compensation in a forward prediction mode and generating a backward-predicted image by performing motion compensation in a backward prediction mode,
    wherein the changing means changes the process performed in the motion compensation such that if the current image to be encoded is in a fade period, the changing means changes the process performed on the image in the motion compensation,
    wherein the changing means changes the process performed in the motion compensation such that when a B-picture in a fade period is given as the current image, if the difference between a prediction residual given by the difference between the forward-predicted image and the current image and a prediction residual given by the difference between the backward-predicted image and the current image is less than a predetermined threshold value, the changing means changes the motion compensation mode of the motion compensation into a bidirectional prediction mode.

6. The decoder according to claim 5, wherein the detection means detects the fade period on the basis of the number of intra-coded P-pictures and B-pictures in the given encoded image.

7. The decoder according to claim 5, wherein the detection means detects the fade period on the basis of a change in luminance of successive image frames of the image.

8. A decoding method comprising the steps of:
decoding an encoded image; and
detecting, on the basis of the image, a fade period included in the image and supplying a fade information signal indicating a detection result to an encoder configured to encode the decoded image such that a process performed in encoding of the decoded image is changed in accordance with the fade information signal,
wherein the encoder includes
    acquisition means for acquiring the fade information signal,
    changing means for changing a process performed in the encoding of the image in accordance with the fade information signal, and
    generation means for generating a forward-predicted image by performing motion compensation in a forward prediction mode and generating a backward-predicted image by performing motion compensation in a backward prediction mode,
    wherein the changing means changes the process performed in the motion compensation such that if the current image to be encoded is in a fade period, the changing means changes the process performed on the image in the motion compensation,
    wherein the changing means changes the process performed in the motion compensation such that when a B-picture in a fade period is given as the current image, if the difference between a prediction residual given by the difference between the forward-predicted image and the current image and a prediction residual given by the difference between the backward-predicted image and the current image is less than a predetermined threshold value, the changing means changes the motion compensation mode of the motion compensation into a bidirectional prediction mode.

9. A non-transitory computer-readable medium encoded with a program causing a computer to execute the steps of:
decoding an encoded image; and
detecting, on the basis of the image, a fade period included in the image and supplying a fade information signal indicating a detection result to an encoder configured to encode the decoded image such that a process performed in encoding of the decoded image is changed in accordance with the fade information signal,
wherein the encoder includes
    acquisition means for acquiring the fade information signal,
    changing means for changing a process performed in the encoding of the image in accordance with the fade information signal, and
    generation means for generating a forward-predicted image by performing motion compensation in a forward prediction mode and generating a backward-predicted image by performing motion compensation in a backward prediction mode,
    wherein the changing means changes the process performed in the motion compensation such that if the current image to be encoded is in a fade period, the changing means changes the process performed on the image in the motion compensation,
    wherein the changing means changes the process performed in the motion compensation such that when a B-picture in a fade period is given as the current image, if the difference between a prediction residual given by the difference between the forward-predicted image and the current image and a prediction residual given by the difference between the backward-predicted image and the current image is less than a predetermined threshold value, the changing means changes the motion compensation mode of the motion compensation into a bidirectional prediction mode.

10. An encoder comprising:
acquisition means for acquiring a fade information signal indicating whether the current image to be encoded is in a fade period, changing means for changing a process performed in the encoding of the image in accordance with the fade information signal, and generation means for generating a forward-predicted image by performing motion compensation in a forward prediction mode and generating a backward-predicted image by performing motion compensation in a backward prediction mode, wherein the changing means changes the process performed in the motion compensation such that if the current image to be encoded is in a fade period, the changing means changes the process performed on the image in the motion compensation, wherein the changing means changes the process performed in the motion compensation such that when a B-picture in a fade period is given as the current image, if the difference between a prediction residual given by the difference between the forward-predicted image and the current image and a prediction residual given by the difference between the backward-predicted image and the current image is less than a predetermined threshold value, the changing means changes the motion compensation mode of the motion compensation into a bidirectional prediction mode.

11. The encoder according to claim 10, wherein the changing means changes the process performed in the motion compensation such that if the current image is a P-picture in a fade period, the changing means changes a mode associated with weighting of prediction in the motion compensation into a weighted prediction mode.

12. The encoder according to claim 10, wherein the changing means changes the process performed in the motion compensation such that if the current image is a B-picture in a fade period, the changing means changes a mode associated with weighting of prediction in the motion compensation into an explicit weighted prediction mode or an implicit weighted prediction mode.

13. The encoder according to claim 10, wherein the changing means changes the process performed in the motion compensation such that if the current image is a B-picture in a fade period, the changing means changes the motion compensation mode of the motion compensation into a bidirectional prediction mode.

14. The encoder according to claim 10, wherein if the current image is in a fade period, the changing means changes a GOP (Group Of Pictures) structure of the image.

15. The encoder according to claim 14, wherein the GOP structure is changed so as to include one or more P-pictures and one or more I-pictures.

16. The encoder according to claim 14, wherein the GOP structure is changed so as to include one B-picture between adjacent two P-pictures.

17. The encoder according to claim 14, wherein the GOP structure is changed so as to include two B-pictures between adjacent two P-pictures.

18. The encoder according to claim 10, wherein the changing means changes a bit rate assigned to the image in encoding of the image.

19. The encoder according to claim 18, wherein if the current image is in a fade period, the changing means changes the bit rate so as to be greater than a predetermined value.

20. The encoder according to claim 18, wherein the changing means changes the bit rate such that when the current image is not in any fade period, if the total amount of code of an already encoded image is greater than a target value, the changing means changes the bit rate such that the bit rate of an image to be encoded is reduced.

21. The encoder according to claim 10, wherein the changing means changes a weighting factor matrix by which coefficients obtained as a result of an orthogonal transformation of the image are weighted depending on frequencies of the coefficients when the coefficients are quantized.

22. The encoder according to claim 21, wherein if the current image is in a fade period, the changing means changes the weighting factor matrix used in the quantization of the coefficients such that weighting factors for coefficients of frequencies higher than a predetermined frequency are greater than predetermined weighting factors, and weighting factors for coefficients of frequencies lower than the predetermined frequency are smaller than the predetermined weighting factors.

23. The encoder according to claim 21, wherein if the current image is in a fade period, the changing means changes the weighting factor matrix used in the quantization of the coefficients such that weighting factors for coefficients of frequencies higher than a predetermined frequency are equal to predetermined weighting factors, and weighting factors for coefficients of frequencies lower than the predetermined frequency are smaller than the predetermined weighting factors.

24. The encoder according to claim 21, wherein if the current image is in a fade period, the changing means changes the weighting factor matrix used in the quantization of the coefficients such that weighting factors for coefficients of frequencies higher than a predetermined frequency are greater than predetermined weighting factors, and weighting factors for coefficients of frequencies lower than the predetermined frequency are equal to the predetermined weighting factors.

25. An encoding method comprising the steps of:
acquiring a fade information signal indicating whether a current image to be encoded is in a fade period;
changing a process performed in the encoding of the image in accordance with the fade information signal; and
generating a forward-predicted image by performing motion compensation in a forward prediction mode and generating a backward-predicted image by performing motion compensation in a backward prediction mode,
wherein the changing step includes changing the process performed in the motion compensation such that if the current image to be encoded is in a fade period, changing the process performed on the image in the motion compensation,
wherein the changing step further includes changing the process performed in the motion compensation such that when a B-picture in a fade period is given as the current image, if the difference between a prediction residual given by the difference between the forward-predicted image and the current image and a prediction residual given by the difference between the backward-predicted image and the current image is less than a predetermined threshold value, changing the motion compensation mode of the motion compensation into a bidirectional prediction mode.

26. A non-transitory computer-readable medium encoded with a program causing a computer to execute the steps of:
acquiring a fade information signal indicating whether a current image to be encoded is in a fade period;
changing a process performed in the encoding of the image in accordance with the fade information signal; and
generating a forward-predicted image by performing motion compensation in a forward prediction mode and generating a backward-predicted image by performing motion compensation in a backward prediction mode, wherein the changing step includes changing the process performed in the motion compensation such that if the current image to be encoded is in a fade period, changing the process performed on the image in the motion compensation, wherein the changing step further includes changing the process performed in the motion compensation such that when a B-picture in a fade period is given as the current image, if the difference between a prediction residual given by the difference between the forward-predicted image and the current image and a prediction residual given by the difference between the backward-predicted image and the current image is less than a predetermined threshold value, changing the motion compensation mode of the motion compensation into a bidirectional prediction mode.

27. An image processing system including a hardware decoder configured to decode an encoded image and a hardware encoder configured to encode the image decoded by the hardware decoder, the hardware decoder including
a decoding unit configured to decode the encoded image, and
a detector configured to detect, on the basis of the image, a fade period included in the image and supplying a fade information signal indicating a detection result to the hardware encoder, the hardware encoder including
an acquisition unit configured to acquire the fade information signal,
a changing unit configured to change a process performed in the encoding of the image in accordance with the fade information signal, and
a generator configured to generate a forward-predicted image by performing motion compensation in a forward prediction mode and generate a backward-predicted image by performing motion compensation in a backward prediction mode,
wherein the changing unit changes the process performed in the motion compensation such that if the current image to be encoded is in a fade period, the changing unit changes the process performed on the image in the motion compensation,
wherein the changing unit changes the process performed in the motion compensation such that when a B-picture in a fade period is given as the current image, if the difference between a prediction residual given by the difference between the forward-predicted image and the current image and a prediction residual given by the difference between the backward-predicted image and the current image is less than a predetermined threshold value, the changing unit changes the motion compensation mode of the motion compensation into a bidirectional prediction mode.

28. A hardware decoder comprising:
a decoding unit configured to decode an encoded image; and
a detector configured to detect, on the basis of the image, a fade period included in the image and supplying a fade information signal indicating a detection result to a hardware encoder configured to encode the decoded image such that a process performed in encoding of the decoded image is changed in accordance with the fade information signal, wherein the hardware encoder includes
an acquisition unit configured to acquire the fade information signal,
a changing unit configured to change a process performed in the encoding of the image in accordance with the fade information signal, and
a generator configured to generate a forward-predicted image by performing motion compensation in a forward prediction mode and generate a backward-predicted image by performing motion compensation in a backward prediction mode,
wherein the changing unit changes the process performed in the motion compensation such that if the current image to be encoded is in a fade period, the changing unit changes the process performed on the image in the motion compensation,
wherein the changing unit changes the process performed in the motion compensation such that when a B-picture in a fade period is given as the current image, if the difference between a prediction residual given by the difference between the forward-predicted image and the current image and a prediction residual given by the difference between the backward-predicted image and the current image is less than a predetermined threshold value, the changing unit changes the motion compensation mode of the motion compensation into a bidirectional prediction mode.

29. A hardware encoder comprising:
an acquisition unit configured to acquire a fade information signal indicating whether the current image to be encoded is in a fade period,
a changing unit configured to change a process performed in the encoding of the image in accordance with the fade information signal, and
a generator configured to generate a forward-predicted image by performing motion compensation in a forward prediction mode and generate a backward-predicted image by performing motion compensation in a backward prediction mode,
wherein the changing unit changes the process performed in the motion compensation such that if the current image to be encoded is in a fade period, the changing unit changes the process performed on the image in the motion compensation,
wherein the changing unit changes the process performed in the motion compensation such that when a B-picture in a fade period is given as the current image, if the difference between a prediction residual given by the difference between the forward-predicted image and the current image and a prediction residual given by the difference between the backward-predicted image and the current image is less than a predetermined threshold value, the changing unit changes the motion compensation mode of the motion compensation into a bidirectional prediction mode.

* * * * *